US007887092B1

(12) United States Patent
Pacheco et al.

(10) Patent No.: US 7,887,092 B1

(45) Date of Patent: Feb. 15, 2011

(54) VEHICLE ASSISTED HARPOON BREACHING TOOL

(75) Inventors: James E. Pacheco, Albuquerque, NM (US); Steven E. Highland, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 931 days.

(21) Appl. No.: 11/624,325

(22) Filed: Jan. 18, 2007

(51) Int. Cl.
*B60R 19/54* (2006.01)

(52) U.S. Cl. ...................................... 280/762; 280/727

(58) Field of Classification Search ...................... 43/6; 280/762, 727, 763.1; 294/120; 414/24.5
See application file for complete search history.

(56) References Cited

U.S. PATENT DOCUMENTS

| | | | | | |
|---|---|---|---|---|---|
| 3,102,525 | A | * | 9/1963 | Englis | 124/57 |
| 3,600,835 | A | * | 8/1971 | Hendricks | 43/6 |
| 3,981,517 | A | * | 9/1976 | Crochet, Sr. | 280/478.1 |
| 4,982,523 | A | * | 1/1991 | Garton | 43/6 |
| 5,067,237 | A | | 11/1991 | Holder | |
| 5,088,174 | A | | 2/1992 | Hull et al. | |
| 5,167,043 | A | | 12/1992 | Lope et al. | |
| 5,177,850 | A | | 1/1993 | Hull et al. | |
| 5,769,394 | A | | 6/1998 | Yirmiyahu et al. | |
| 5,987,723 | A | | 11/1999 | McNally et al. | |
| 6,035,946 | A | | 3/2000 | Studley et al. | |
| 6,176,519 | B1 | * | 1/2001 | Limingoja | 280/762 |
| 7,591,477 | B2 | * | 9/2009 | Pohler | 280/502 |
| 2010/0040436 | A1 | * | 2/2010 | Bruha et al. | 414/24.5 |

* cited by examiner

*Primary Examiner*—Christopher P Ellis
(74) *Attorney, Agent, or Firm*—Robert D. Watson

(57) ABSTRACT

A harpoon breaching tool that allows security officers, SWAT teams, police, firemen, soldiers, or others to forcibly breach metal doors or walls very quickly (in a few seconds), without explosives. The harpoon breaching tool can be mounted to a vehicle's standard receiver hitch.

31 Claims, 29 Drawing Sheets

VEHICLE ASSISTED HARPOON BREACHING TOOL

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates generally to a method and apparatus for making rapid, forced entry into a structure, such as a door or section of wall.

A need exists for police, firemen, SWAT teams, and security officers to breach doors or walls very quickly (e.g., in a few seconds). Many types of forced entry tools are commercially available, e.g., cutting saws, spreading tools, explosive devices, “burning” devices, etc. However, these devices have their own inherent problems, such as noise, time-delay, fire hazard, close-proximity of personnel, etc.

SUMMARY OF THE INVENTION

A harpoon breaching tool that allows security officers, SWAT teams, police, firemen, soldiers, or others to forcibly breach metal doors or walls very quickly (in a few seconds), without explosives. The harpoon breaching tool can be mounted to a vehicle’s standard receiver hitch.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Figure 1A:
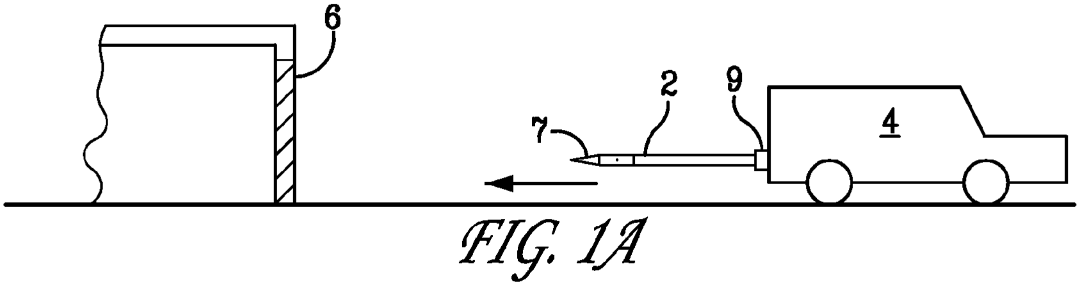
FIGS. 1A-1C illustrate a first example of a method of breaching a wall or door using a vehicle-mounted harpoon breaching tool.
Figure 1B:
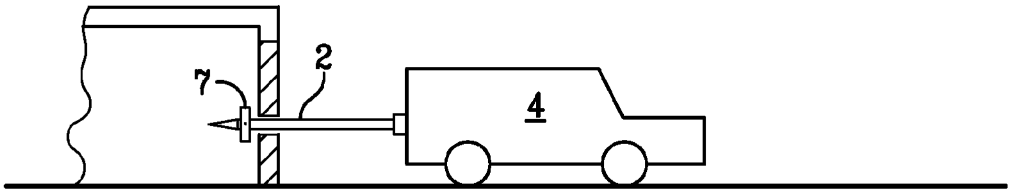
Figure 1C:
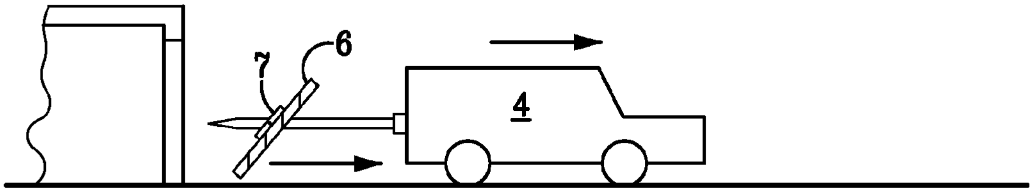

FIGS. 1A-1C illustrate a first example of a method of breaching a wall or door using a vehicle-mounted harpoon breaching tool, comprising:

a) mounting a harpoon breaching tool 2 to the structural frame 9 of a vehicle 4;

b) driving the vehicle 4 towards the wall or door 6;

c) impacting and penetrating the wall or door 6 with the tip of the harpoon 2;

d) releasing a pivot blade 7 and hooking the inside of the wall or door 6 with the blade;

e) reversing direction, and driving the vehicle 4 away from the wall or door 6; and f) pulling on the hooked harpoon tool 2 with the vehicle 4 with sufficient force to pull out the door 6 or a section of the wall, thereby breaching it.

Figure 2A:
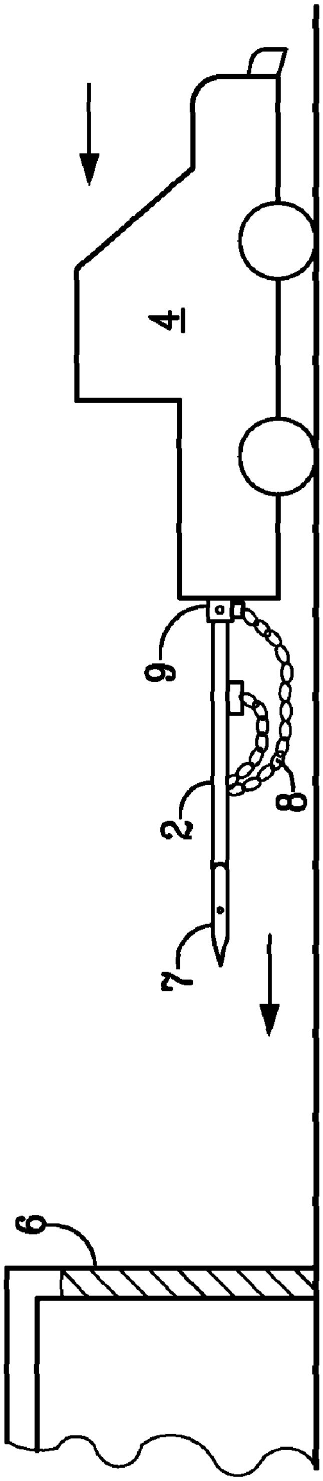
FIGS. 2A-2D illustrate another example of a method of breaching a wall or door using a vehicle-mounted harpoon breaching tool.
Figure 2B:
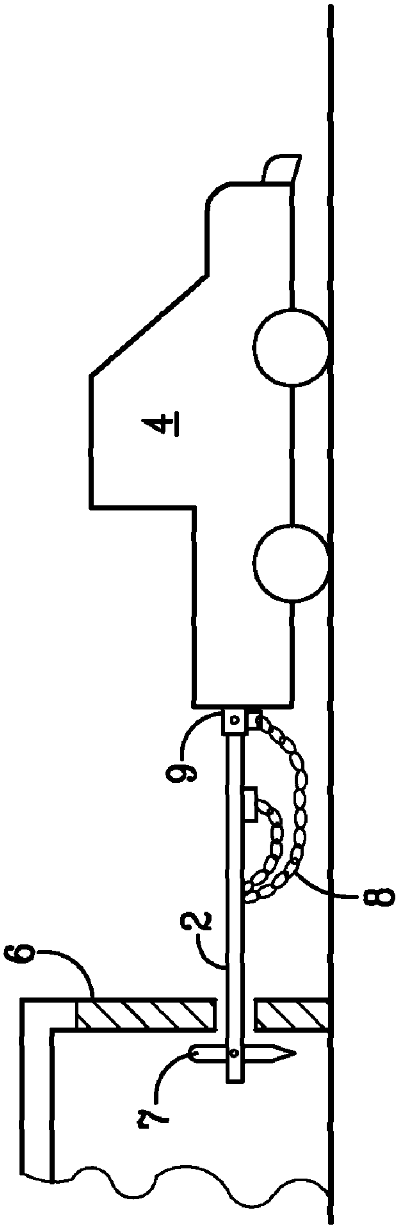
Figure 2C:
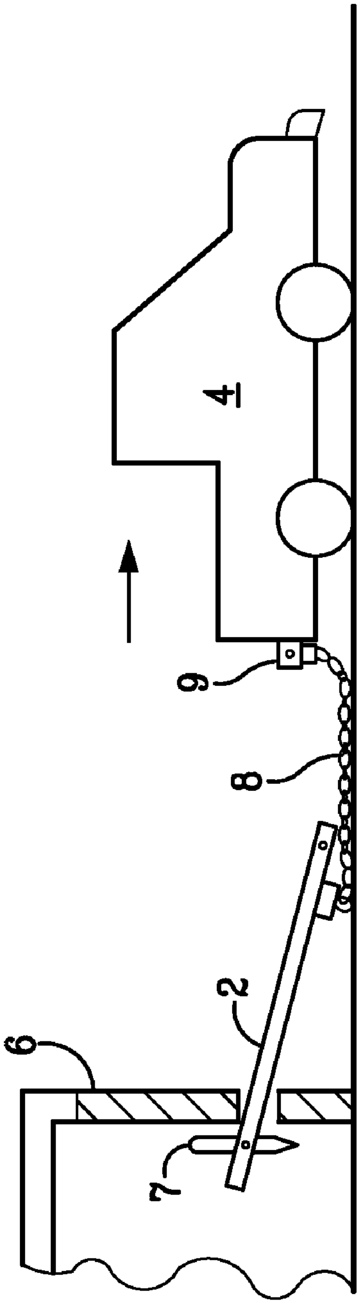
Figure 2D:
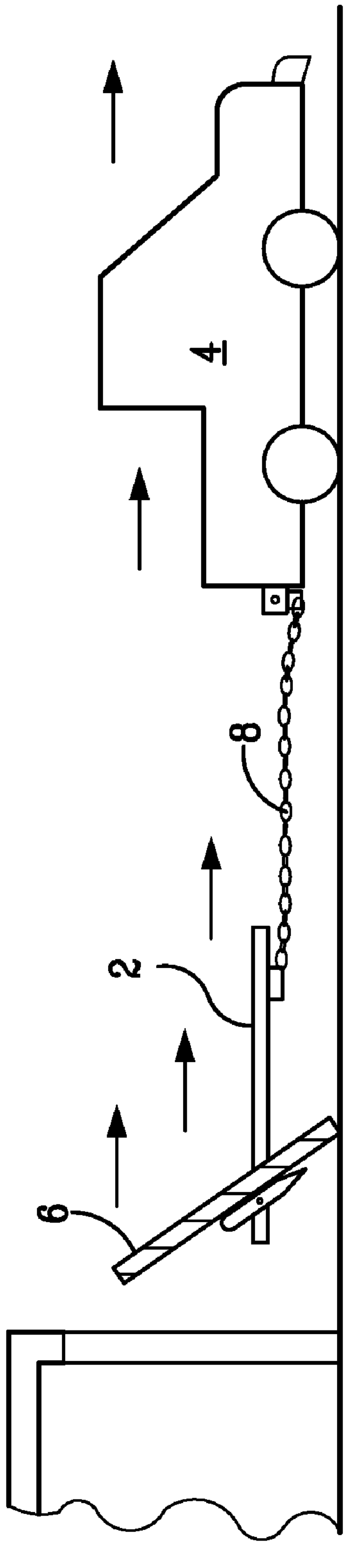

FIGS. 2A-2D illustrate a second example of a method of breaching a wall or door using a vehicle-mounted harpoon breaching tool, comprising:

a) temporarily attaching a harpoon breaching tool 2 to the structural frame 9 of vehicle 4;

b) attaching a bundled, flexible connecting member 8 to the harpoon 2 at one end and to the vehicle's frame 9 at the other end;

c) driving the vehicle 4 towards the wall or door 6 (FIG. 2A);

d) impacting and penetrating the wall or door 6 with harpoon 2 (FIG. 2B);

e) releasing a pivot blade 7 and hooking the inside of the wall or door 6 with the blade;

f) reversing direction, and driving the vehicle 4 away from the wall or door 6;

g) as the vehicle is driving away, contacting the released pivot blade 7 with the inside of door 6, and then detaching the harpoon 2 from the vehicle's frame 9 (FIG. 2C), whereupon the flexible connecting member 8 falls slack;

h) when the moving vehicle 4 eventually snaps the flexible connecting member 8 tight (FIG. 2D), the vehicle's momentum applies a large impulse force to the door 6 via the harpoon 2, thereby pulling out the door or breaking out a section of the wall.

The flexible connecting member 8 may be, for example, a chain, a towing strap, or a steel cable. If necessary, after the first impulsive force has been applied, the process can be repeated, i.e., reversing the vehicle, backing towards the door or wall to create slack in the flexible connecting member, then driving forward again and applying another impulse when the flexible connecting member snaps tight; and repeating this as many times as necessary until the door or section of wall is breached.

Examples of structures that can be breached include metal doors, wood doors, concrete block walls, commercial building wall construction, brick walls, wood frame walls, etc.

In one embodiment, a harpoon breaching tool may comprise:

an elongated support shaft having a front end, a back end, and a centerline;

a sliding collar disposed for sliding along the shaft;

a pivot pin oriented perpendicular to the shaft's centerline; and a pivot blade pivotally connected to the front end of the support shaft by the pivot pin; and a tapered tip for piercing through a metal door or wall and making a penetration large enough for the pivot blade to pass through;

wherein at least some of the blade is disposed inside of the shaft when the blade is held in an un-released position by the sliding collar; and wherein the blade can pivot outwards through a longitudinal opening in the support shaft when the sliding collar has slid sufficiently far towards the rear end of the shaft so as to release the blade.

Figure 3:
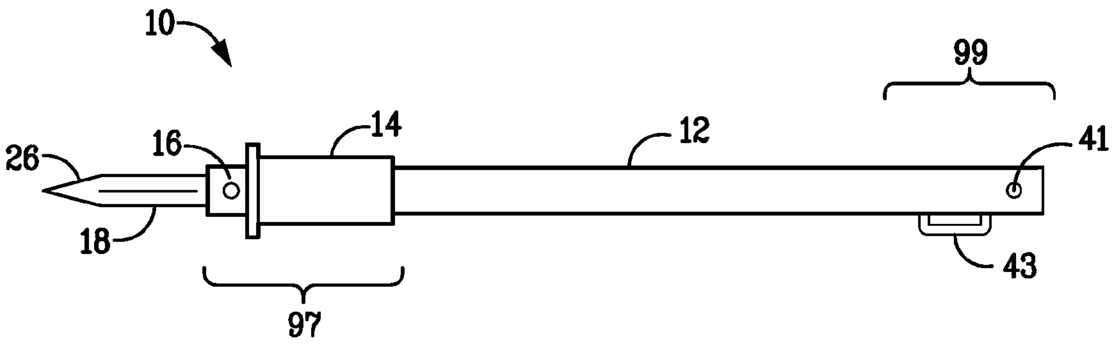
FIG. 3 shows a side view of an example of a harpoon breaching tool.

FIG. 3 shows a side view of a first example of a harpoon breaching tool, according to the present invention. Harpoon 10 can comprise an elongated support shaft 12 with a front end 97 and a back end 99, and a centerline along the length of the shaft. Shaft 12 can have a thru-hole 41, and a loop 43 for attaching a chain to. Pivot blade 18 is pivotally mounted to the support shaft 12 by pivot/hinge pin 16. Blade 18 has a tapered tip 26, which can have a sharp point or a blunt point. Sliding collar 14 holds the blade 18 in a un-released position (i.e., substantially parallel to the long axis of shaft 12), until such time as the collar 14 slides backwards towards rear end 99, and releases the blade 18, which can then rotate/pivot into a locking/hooking position (e.g., perpendicular to the centerline of shaft 12), through an longitudinal opening (not shown) in shaft 12. Shaft 12 can be a solid cross-section (like a bar) or a hollow cross-section (like a pipe). The cross-sectional shape of shaft 12 can be, for example, square, circular, rectangular, oval, U-shaped, T-shaped, or I-Beam shaped. It can have a round shape at one end, and a square shape at the other end. Shaft 12 can comprise multiple segments (not shown), coupled end-to-end, for extending the total length of the harpoon 10.

In FIG. 3, pivot blade 18 serves two functions: (1) to pierce through the door or wall with the tapered tip 26, and (2) to rotate or pivot into a "locking" or "hooking" position that hooks the door and prevents the shaft 12 from being withdrawn when pulled backwards away from the door; thereby allowing the door (or section of wall) to be rapidly pulled out of its frame.

Pivot/Hinge pin 16 can be selected from a wide variety of industrial pins. Industrial pins are cylindrical fasteners that are used to locate, align and join components. They are typically made out of aluminum, brass, titanium, wood and plastic. Products made from hardened steel, unhardened steel, low-carbon steel, and stainless steel are also available. There are several basic types of industrial pins. Categories include dowel pins, spring pins, cotter pins and wire clips, hitch pins and lynch pins, locating and fixture pins, and specialty products. Important dimensions for industrial pins include inner diameter, outer diameter, and length.

Dowel pins are industrial pins that are used to prevent motion or slippage. Straight, oversize, undersize, and knurled products are commonly available. Parallel dowel pins have ends that are machined to two different tolerances. Stepped dowel pins have two different body diameters altogether. Pull dowel pins have a threaded hole in one end so that a screw can be inserted to help remove the pin from a blind hole. Threaded and non-threaded taper pins are also available. Standard groove pins contain longitudinal grooves. By contrast, spiral groove pins contain latitudinal grooves. Escutcheon pins have a semi-spherical head at one end and a long cone at the other. They are usually hammered in place and used for light-duty jobs. Drive pins feature an interference fit and are often used to assemble components in rotary or other moving applications.

Industrial pins also include several types of spring pins, cotter pins and wire clips. Coiled spring pins are hollow and made of metal. Roll pins or slotted steel springs are headless, hollow fasteners with a longitudinal slot that runs down the length of the pin. Cotter pins open out after passing through a hole. A popular type is the extended or hammerlock cotter pin; however, hairpin and circle (ring) cotter pins are also available. Twist pins feature a self-locking mechanism and can be used as replacements for standard hairpin cotters. Clinch pins are manufactured with a hump on one end and are self-securing. Industrial-quality safety pins are commonly available.

Industrial pins also include several types of hitch pins, lynch pins, locating pins, and fixturing pins. Hitch pins have a wire loop grip at one end. Lynch pins also have a ring-shaped loop, but snap into place. Clevis pins have a head on one end and a hole in the other. Like hitch pins and lynch pins, clevis pins are used in conjunction with cotter pins. Other types of hitch pins include toggle pins, detent pins, and wire locks. A variety of locating and fixturing pins are available. Examples include clamping pins, quick release pins, drift pins, and indexing or pop pins. L-pins and T-pins have a letter-shaped handle at one end. Round pins and diamond pins have either a small or large locating shoulder. Cone locator pins can compensate for a great deal of misalignment. Floating locating pins are used to provide precise, 1-axis location while floating in the perpendicular axis.

Industrial pins include many types of specialized or proprietary products. Ejector pins are small fasteners that are designed to push or eject parts or materials. Expanding diameter pins expand when a cam is actuated to provide a tight fit. Shear pins are designed to break if the fastened components move in opposite, parallel directions to their mating surfaces. Weld pins are designed to be welded in place.

Figure 4A:
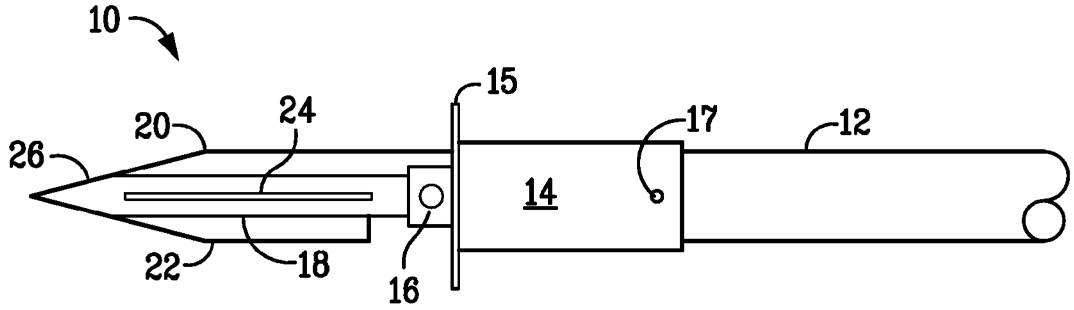
FIG. 4A shows a side view of another example of a harpoon breaching tool.

FIG. 4A shows a side view of the front end of a harpoon breaching tool 10. Pivot blade 18 can be a solid cylindrical rod with a tapered tip 26, and a thru-hole for accepting a pivot/hinge pin 16. The taper angle of tapered tip 26 may be 5-45 degrees, depending on the hardness of the tip, the strength of the door or wall being penetrated, angle of attack, etc. Alternatively, the taper angle may be in the range of 10-30 degrees, as measured from the shaft's centerline (i.e., 20-60 degrees total included angle). Hinge pin 16 pivotally connects the blade 18 to the front end of support shaft 12. Shaft 12 can be a hollow pipe. The location of the pivot pin 16 can be offset forwards or backwards from the center-of-gravity, e.g., towards the rear end of blade 18, so that the eccentric mounting point causes the blade to freely rotate downwards under gravity when released. Alternatively, the hinge pin can be centered on the blade's center-of-gravity. Optionally, one or more springs can be used to forcibly rotate the blade when released. A longitudinal opening/slot (not seen in this view) is disposed in the top of pipe 12 to allow the rearward portion of blade 18 rotate outwards when released. Optionally, a short slot (not seen in this view) can be cut into the bottom of pipe 12 to allow blade 18 to fully rotate into a vertical position, perpendicular to shaft 12, when released.

Sliding collar 14 can have a flange or ring 15 of a larger diameter than the collar, attached to the front end of the collar, to help insure that the collar 14 will be pushed backwards when the blade 18 penetrates through the door or wall, thereby insuring release of the blade. Collar 14 can have a small hole 17 (with a matching thru-hole in pipe 12), for placing a small-diameter sacrificial shear pin/dowel, made from a breakable material, such as wood or plastic, whose function is to hold the collar 14 in place in the un-released/un-deployed position (i.e., covering and holding the blade in the parallel position) before striking the door. Then, during penetration, when collar 14 first makes contact with the door or wall, the sacrificial dowel in hole 17 easily shears and breaks, thereby releasing collar 14 to freely slide backwards as the shaft 12 continues to penetrate deeper through the door. The axial length of collar 14 can be about 2-3 times as long (or more) as the diameter of support shaft 12. This can help to prevent the collar from gouging, digging-in, catching or otherwise hanging-up on the surface of pipe 12 during penetration. This could be a problem, e.g., if the axial length of the collar 14 is much less than the diameter of shaft 12 (e.g., if the collar 14 is a ring); especially if the harpoon tool 10 impacts the door or wall at an oblique angle (i.e., not perpendicular to the door), which would load one side of collar 14 more than the other, and possibly prevent sliding. The outer diameter of flange 15 can be made smaller if hanging-up during oblique angle penetration is a problem.

Pivot blade 18 can have a square, rectangular, circular, oval, triangular, hexagonal, U-shaped, T-shaped, or I-beam shaped cross-sectional shape; and can have a solid or hollow cross-section.

Preferred materials of a harpoon breaching tool 10 are primarily low-carbon steel, but can also include aluminum alloy in places where high strength is not necessarily needed, e.g., the support shaft 12 and sliding collar 14. Blade 18 may be made of a high-strength steel; or made of a lower strength steel with a heat-treated, hardened tip 26. The tip 26 of blade 18 may be coated with a hard coating, e.g., titanium carbide, titanium nitride, as is typically found on drill bits. Alternatively, tip 26 can be a ceramic material or a heavy metal (such as tungsten, molybdenum, depleted uranium). The hinge pin 16 can be made of a high-strength, hardened steel.

In some embodiments, the mass and momentum used for breaching can come from the vehicle, not the breaching tool; hence, it may not be necessary to make the tool especially heavy or massive. For example, the support shaft can be manufactured from a lightweight fiber composite (e.g., fiberglass, carbon-fiber wrapped epoxy/resin matrix, Kevlar or Spectra aramid fiber-wrapped composite). Conversely, in other embodiments, a more massive, heavier harpoon tool (e.g., made of thick-walled, Schedule 80 pipe) may provide greater impulsive power for penetrating through a concrete block wall.

Some examples of dimensions of harpoon breaching tool 10 can be as follows. The shaft 12 can be from 1-4 inches in diameter (or the width of a square cross-section), and can be 6-10 feet long. If the total length of harpoon 10 is about 8 feet or less, then it can fit into the bed of a pickup truck. Hinge pin 16 can be ¼"-1" diameter. The length of blade 18 (total length from tip 26 to back end) can be 6-36 inches, preferably about 10-20 inches long. If made from a solid, cylindrical bar stock, then blade 18 can be 1" diameter. Shaft 12 (as well as blade 18) can be a 1" square solid bar or hollow channel, a 1"×2" rectangular solid bar or hollow channel, or a 2" square solid bar or hollow channel (the latter of which slips nicely into the square hole (about 2⅛" wide on the inside) of a standard 2" trailer receiver hitch on a truck. Shaft 12 and collar 14 can be made of standard, commercially available Schedule 40 or Schedule 80 steel pipe. Shaft 12 and collar 14 can be made of standard, commercially available hollow structural members with square, rectangular, U-shaped, and I-beam shaped cross-sections. In general, the smaller the diameter or width of blade 18 and shaft 14, the easier it is to punch a hole through the door or wall. Also, the smaller the diameter or width of blade 18 and shaft 12, the lighter the weight. However, if blade or shaft becomes too slender (thin), one has to start worrying about buckling the blade or shaft during penetration. Also, the diameter and strength of the hinge pin 16 has to be sufficiently high so as to withstand the forces generated during use.

Figure 4B:
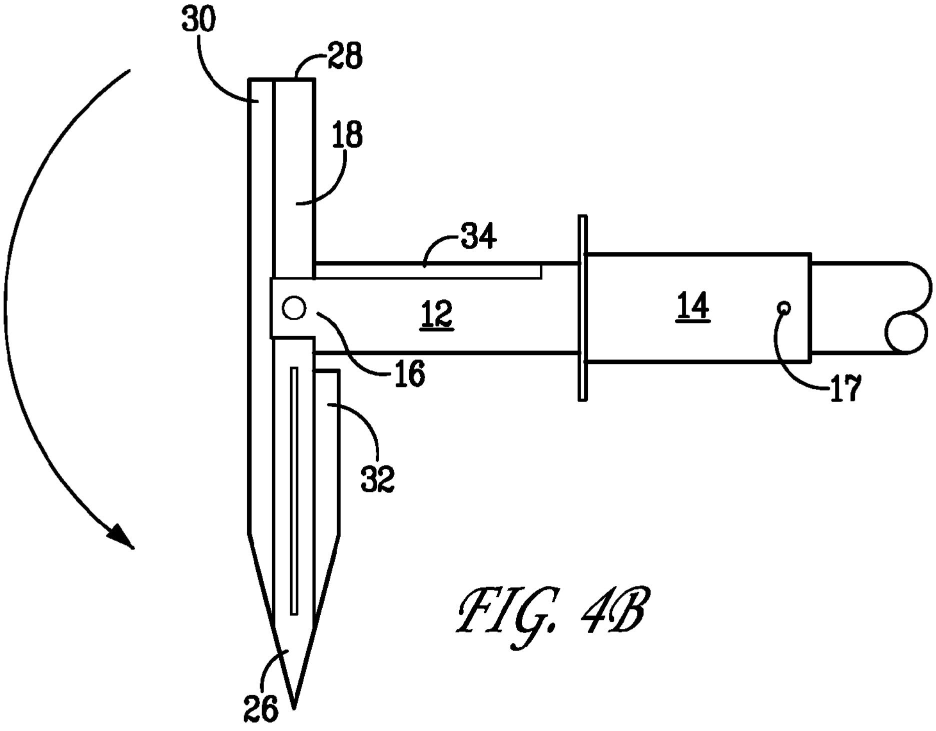
FIG. 4B shows a side view of the harpoon of FIG. 4A.

FIG. 4B shows the blade 18 rotated into the vertical, "locking" position after having been released when the collar 14 has been slid backwards sufficiently far to clear the rear end 28 of blade 18. In this example, the pivot pin 16 is offset from the center of gravity of blade 18, thereby allowing the blade to rotate by gravity. When the blade has rotated into the vertical/perpendicular locking position, it "hooks" the door or wall when shaft 12 is pulled back out, thereby pulling the door or section of wall along with the shaft.

Optionally, pivot blade 18 can have one or more fins (20, 22, 24) attached along the long axis of the blade for allowing more efficient cutting and penetration through the door or wall being breached. The front ends of the fins can have a taper angle that matches the taper angle of the pointed tip 26 of blade 18; or, the angles can be different. In general, the fins are attached along the front half of the blade 18 (see, for example, bottom fin 22 and side fin 24 in FIG. 4A). However, the top fin, 20, can extend all the way to the back end 28 of blade 18. The fins can be, for example, ⅛" steel, and can be welded (spot or continuous) or brazed to blade 18.

Figure 4C:
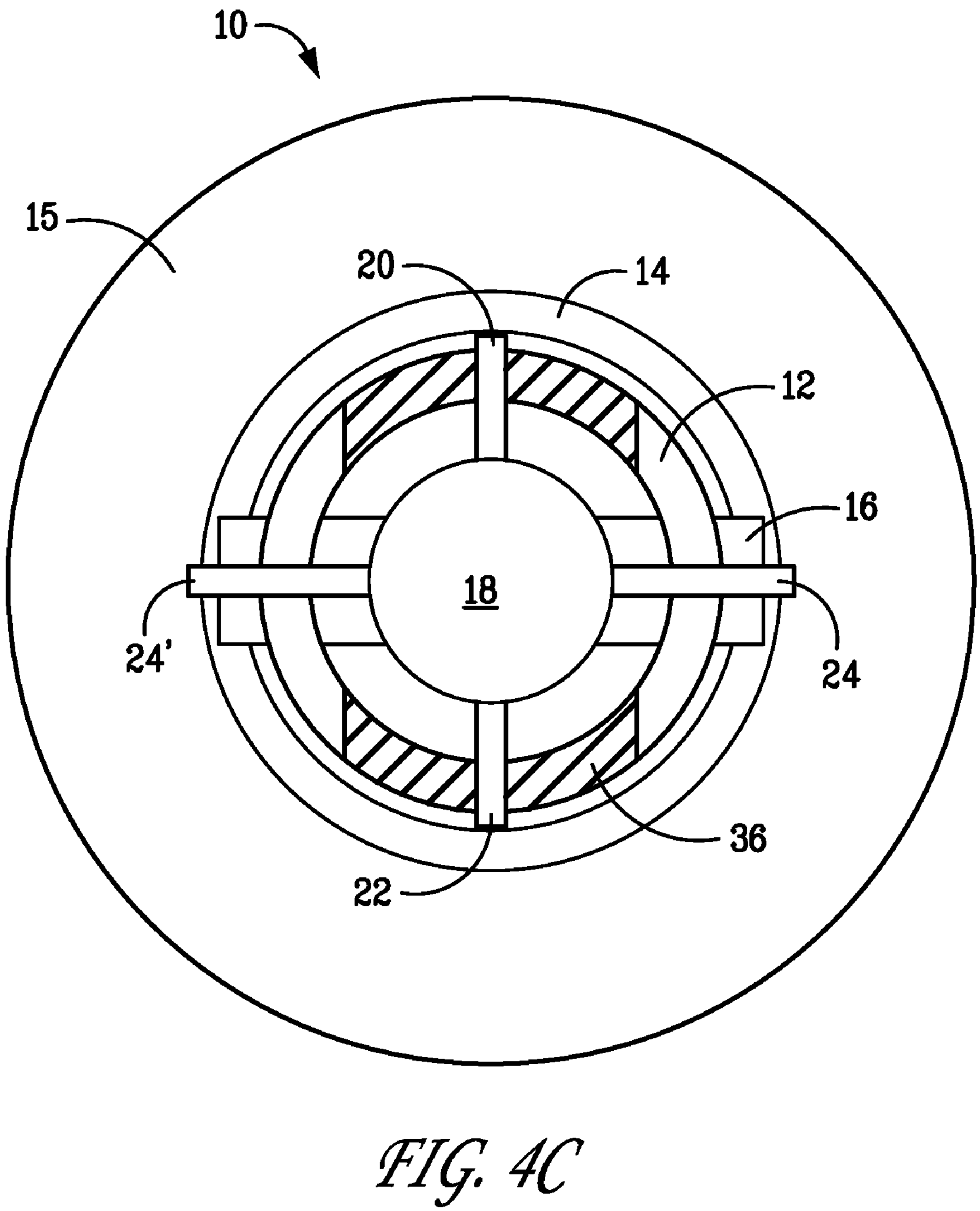
FIG. 4C shows a cross-section view looking at the end of pipe 12.

FIG. 4C shows a cross-section view looking at the end of pipe 12. Blade 18 is a solid cylindrical rod centered at the centerline of pipe 12. Four fins (20, 22, 24 and 24') are attached to rod 18, spaced 90 degrees apart circumferentially, with the upper and lower fins 20 and 22 being aligned vertically, and the two side fins, 24 and 24', being aligned horizontally. In this example, the ends of pivot pin 16 are shown as extending past the outer diameter of pipe 12. This could represent, for example, a bolt head or a nut on a threaded end of pin 16. However, any part of pin 16 that extends beyond pipe 12 might catch on the door or wall during penetration (and/or withdrawal), and cause problems with penetration. To help prevent this from happening, the side fins 24 and 24' can be aligned along the axis of pin 16, and extend radially at least as far out as the exposed ends of pin 16, and, preferably, a bit more beyond (as shown in FIG. 4C), so as to provide a cut/slice/tear in the door or wall that allows for easier, unimpeded passage of the exposed pin ends through the door or wall.

In other embodiments, blade 18 can be spring-loaded, so that it pops-open and pivots outwards when the shaft is oriented in any direction relative to gravity. In this case (spring-loaded blade) the orientation of fins 20, 22 and 24, 24' would not necessarily be restricted to being "vertical" and "horizontal". However, the side fins 24, 24' can still be aligned along hinge pin 16 in the manner shown in FIG. 4C (if the ends of hinge pin 16 are exposed). Blade 18 may have any number of attached fins, from 1 to 8, or more.

In FIG. 4C, sliding collar 14 can be seen, surrounding pipe 12, and has a large diameter flange 15 attached to the collar 14. In this embodiment, where the end of the hinge pin 16 protrude out past the outer diameter of pipe 12, this prevents the collar 14 from accidentally sliding off of the front end of harpoon 10 (i.e., towards the tapered tip 26). Upper slot 34 and lower slot 36, which are cut into pipe 12, can be seen in FIG. 4C. In this example, upper fin 20 and lower fin 22 do not extend radially beyond the inside diameter of sliding collar 14, in order to allow collar 14 to hold blade 18 in the horizontal (i.e., un-deployed) position prior to penetration. Optionally, a pair of washers or bushings (not shown) may be placed onto pin 16, on either side of blade/rod 18, to prevent rod 18 from shifting sideways (i.e., left or right in FIG. 4C) during use (especially during penetration at oblique angles). Keeping the blade/rod 18 centered also helps to insure that it can freely rotate into the locking position fully penetrating the door, and not get hung-up on the inside surfaces of pipe 12.

Alternatively, the ends of hinge pin 16 may be located flush with, or even recessed away from, the outer surface of support shaft 12. Pin 16 may have a thread at one end and a countersunk socket at the other for screwing the pin into a threaded hole in pipe 12. Other types of industrial pins presented earlier can be used for pin 16. There are many options for holding pin 16 in position; including a pressed/hammered fit, a loose fit, soldered or brazed or glued attachment, a shrink fit, a circular clip ring, etc.

Figure 5:
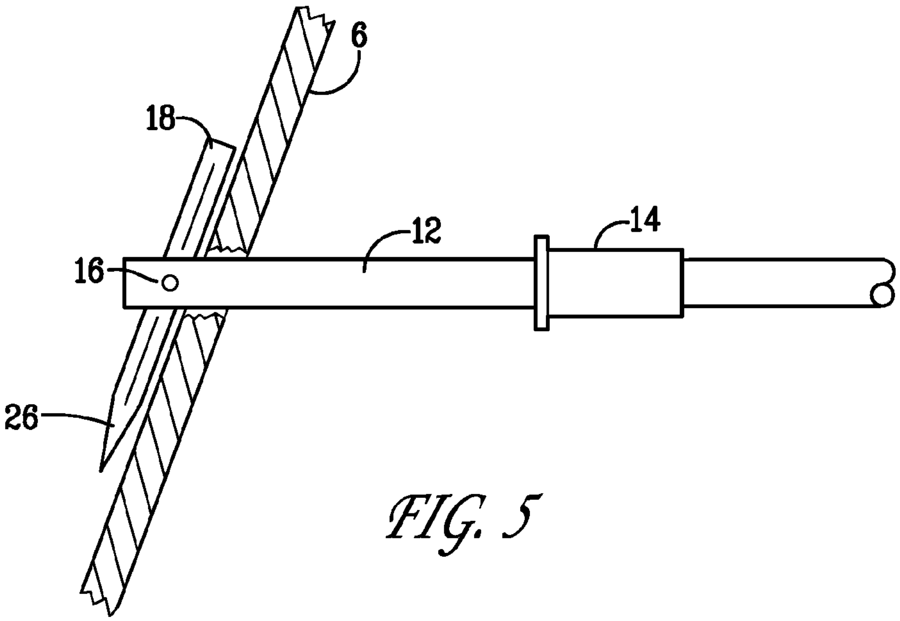
FIG. 5 shows a cross-section side view of the harpoon of FIG. 3, after penetrating door 6.

FIG. 5 shows a cross-section side view of the harpoon of FIG. 3, after penetrating door 6. This drawing illustrates a possible situation where, after penetration, the door has tilted to some non-vertical angle, for whatever reason.

Since blade 18 is free to rotate about hinge pin 16 through a large a large range of angles (essentially 90 degrees), and since the blade is pulled into a position that is flat against the door when being withdrawn, then this allows for the shaft 12 to remain substantially horizontal while being pulled on during removal of the door. In this way, the embodiment of FIG. 3A is self-adjusting for non-vertical doors and wall sections.

Figure 6A:
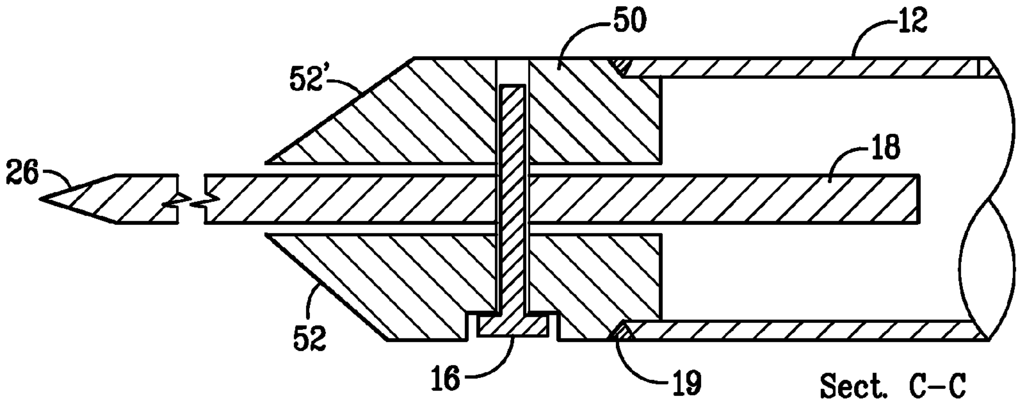
FIG. 6A shows a cross-section top view of another example of a harpoon tool.
Figure 6B:
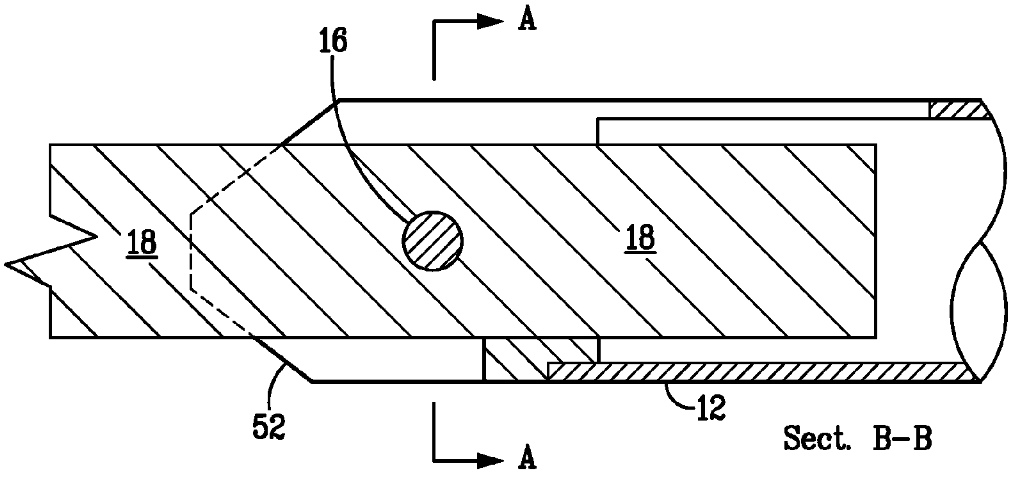
FIG. 6B shows a schematic side view of FIG. 6A.
Figure 6C:
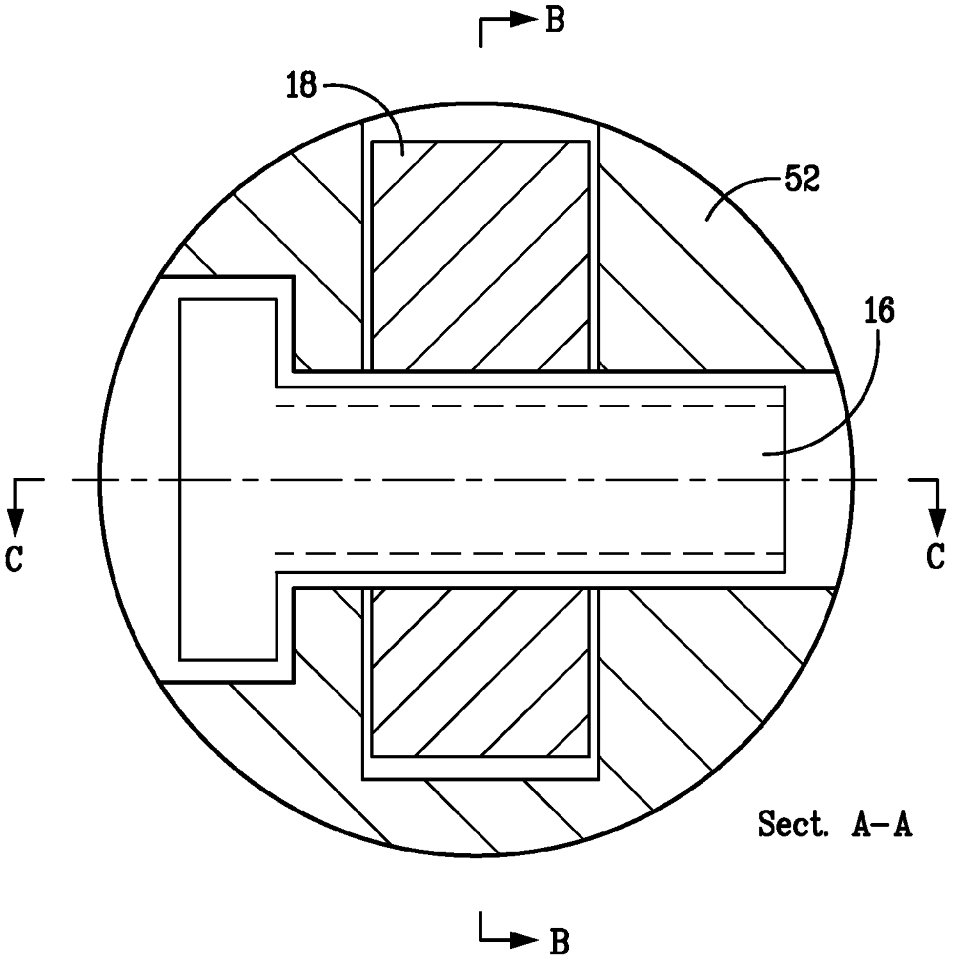
FIG. 6C shows a cross-section view through the hinge pin 16 as viewed from the end of tool 10.

FIG. 6A shows a cross-section top view of another example of a harpoon tool, 10. A monolithic block/plug 50 made of steel is welded on to the front end of pipe 12. Block 50 has a deep slot for housing blade 18, which rotates freely on hinge pin 16. Block 50 has a pair of tapered, conical-shaped front end shapes, 52 and 52', which provide a smooth transition from the width of blade 18 to the outer diameter of pipe 12. A 30-degree taper angle is shown; however, this angle may be too blunt and can cause the door to buckle inwards. Hence, a shallower angle, e.g., 10-20 degrees, may do a better job of penetrating the door without buckling. FIG. 6B shows a schematic side view of FIG. 6A. Blade 18 is a flat, rectangular bar with a tapered tip, and is mounted offset from its center of gravity so that it rotates downward by gravity when released. The tests that we performed used this design, with 3" schedule 80 steel pipe for pipe 12. The sliding collar was made of 3½" schedule 40 steel pipe. The blade was made of 1"×3" bar stock, with a 30 degree tapered tip. The length of the blade from the tip to hinge pin 16 was 15 inches, and the length from hinge pin to rear end of the blade was 10 inches, so that the total length of the blade was 25 inches. The hinge pin was a 1"×2.5" long grade 8 hex bolt with 12UNF threads. The length of collar 14 was 12 inches, and a 5" diameter threaded ring was screwed onto the front end of the collar. The bolt head and other end of hinge pin 16 was recessed below the surface of pipe 12. FIG. 6C shows a cross-section view cut through the hinge pin 16, as viewed from the end of harpoon tool 10.

Figure 9:
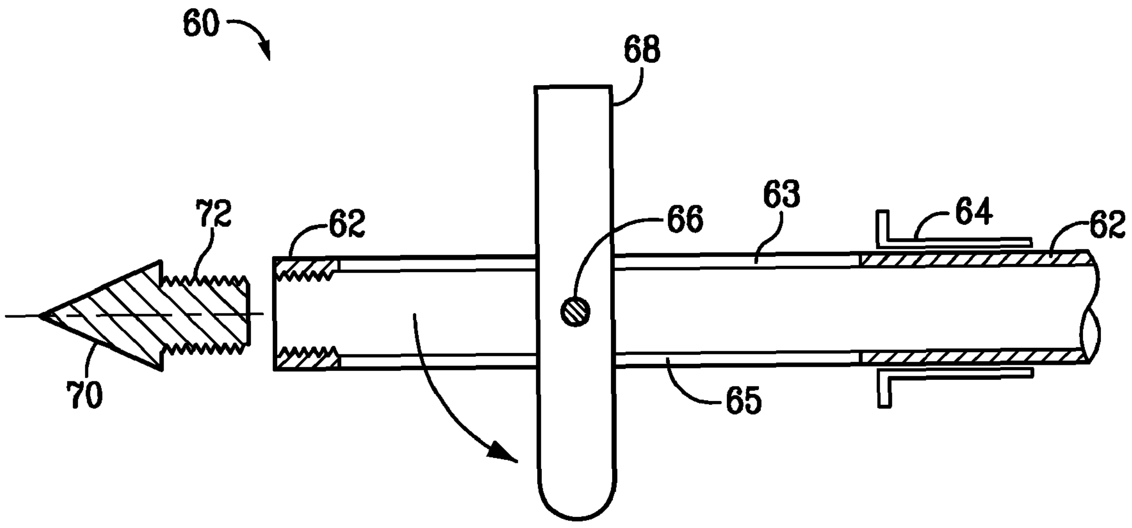
FIG. 9 shows a cross-section side view of another example of a harpoon tool.

FIG. 9 shows a cross-section side view of another example of a harpoon tool. Tool 60 has a support shaft 62, sliding collar 64, hinge pin 66, pivot blade 68, and tapered plug 70. Tapered plug 70 can be made of a solid steel rod, with the taper angle turned on a lathe. Plug 70 may be attached to the front end of shaft 62 by, for example, welding or by a threaded connection. Threads 72 may be pipe threads, to provide a snug fit. Pivot blade 68 can rotate freely about hinge pin 66 as it rotates outwards through upper and lower slots 63, 65, which are cut into shaft 62. Blade 68 can be eccentrically mounted, to allow the bar to rotate by gravity into a locking position. Alternatively, or additionally, blade 68 can be spring-loaded. Shaft 62 can be a pipe, a hollow square channel, or a hollow rectangular channel. The joint between plug 70 and shaft 62 can be flush with the outer surface of shaft 62, to prevent the shaft from hanging-up. Plug 70 can be permanently mounted, or removable for replacement, or re-machining (i.e., re-grinding the tip).

Figure 10:
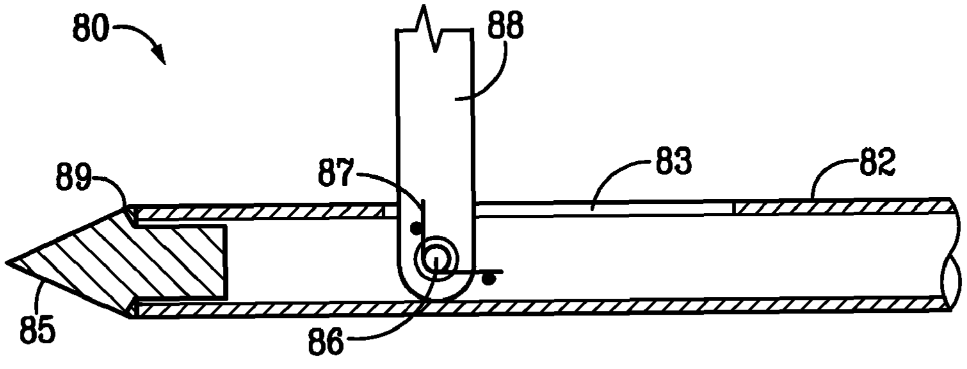
FIG. 10 shows a cross-section side view of another example of a harpoon tool.

FIG. 10 shows a cross-section side view of another example of a harpoon tool. Here, a single pivot blade 88 is deployed through a single slot 83 cut in shaft 82. When released, blade 88 rotates outwardly 90 degrees about hinge pin 86 urged by spring 87. Hinge pin 86 is located near the front end of slot 83, and near the front end of blade 88. Alternatively, if the slot 83 was located on the bottom side of shaft 82, then blade 88 could rotate and fall by gravity alone, when released. Tapered plug/tip 85 can be made of flat, rectangular bar stock, with the taper angle made by bandsaw cutting or equiv. Plug 85 may be welded to shaft 82 at weld-joint 89.

Figure 11A:
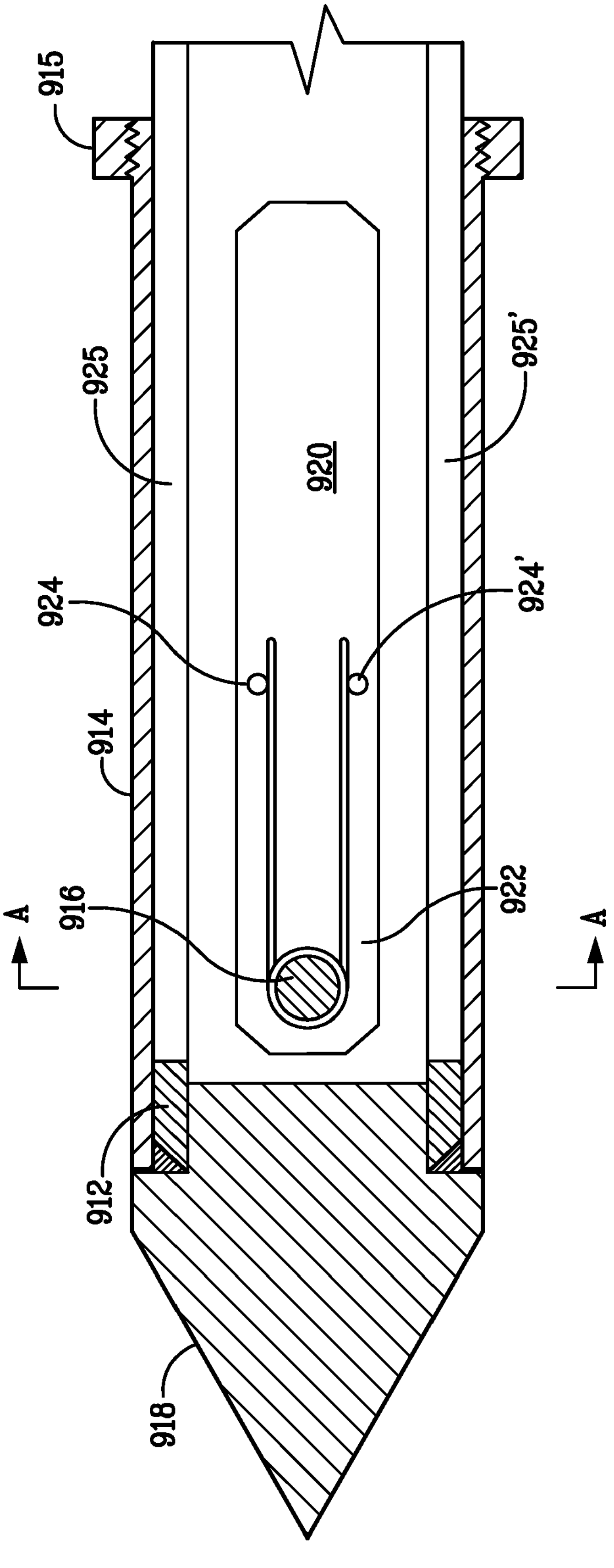
FIG. 11A shows a cross-section side view of a spring-loaded, two-blade harpoon.
Figure 11B:
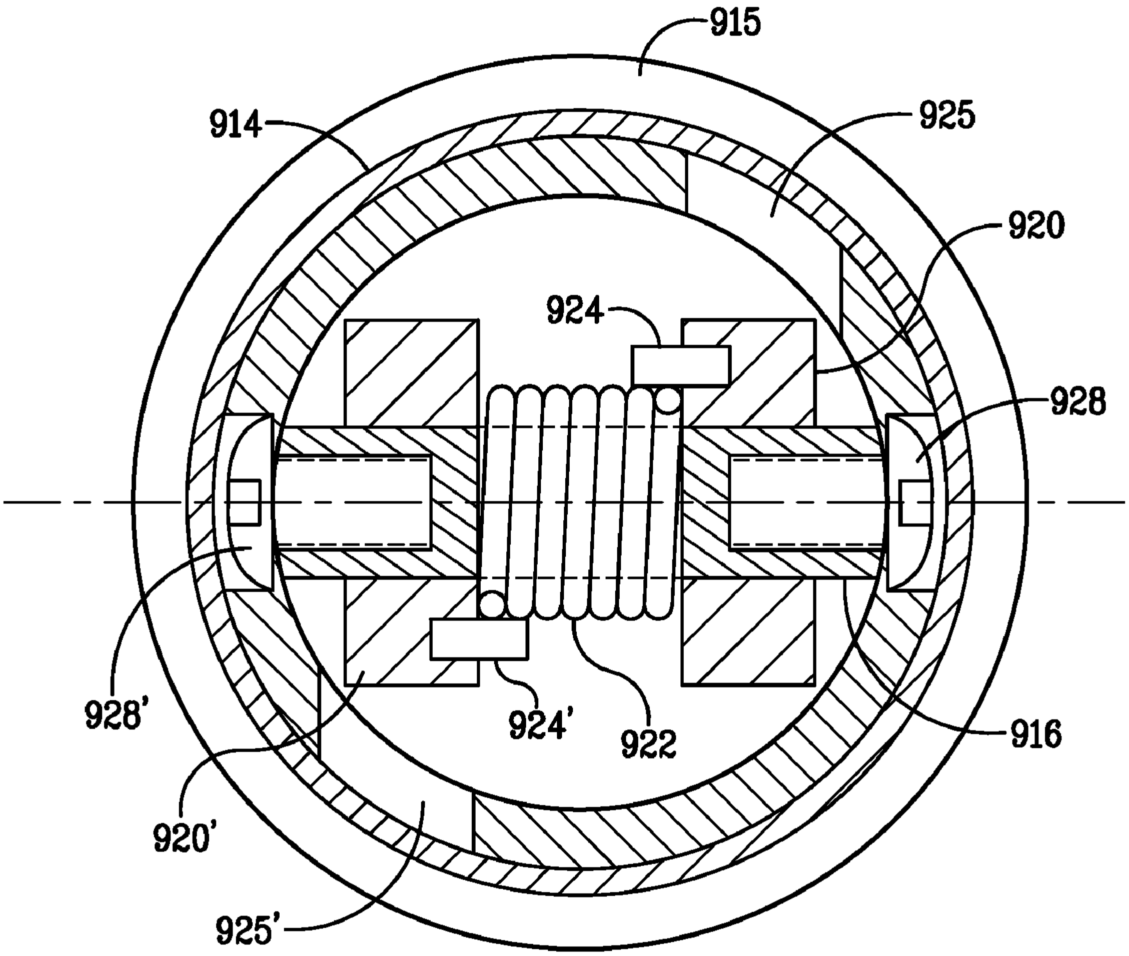
FIG. 11B shows a cross-section end view of a spring-loaded, two-blade harpoon.

FIGS. 11A and 11B show side views and cross-section end views of a spring-loaded, offset, two-blade harpoon tool. Here, the two pivot blades 920 and 920' spring out from opposite sides of the support shaft 912, though longitudinal openings 925 and 925', respectively, after being released when the sliding collar 915 has been pushed backwards. A torsion coil spring 922 is wrapped around the hinge pin 916, and becomes pre- (i.e., "cocked", tensioned) when the two blades are recessed inside of the shaft 912, and held in place by the sliding collar 914. As shown in FIG. 11B, the hinge pin 916 is held in place by bolts 928 and 928'. Locking blades 920 and 920' are offset on either side of the centerline of the support shaft 912, with each blade swinging through offset openings 925 and 925' in the shaft 912. The two ends of torsion coil spring 922 are pinned to each blade 920 and 920' by press-fit pins 924 and 924', respectively. The spring-loaded blades spring open without the need to rely on gravity to rotate the blades.

Figure 12:
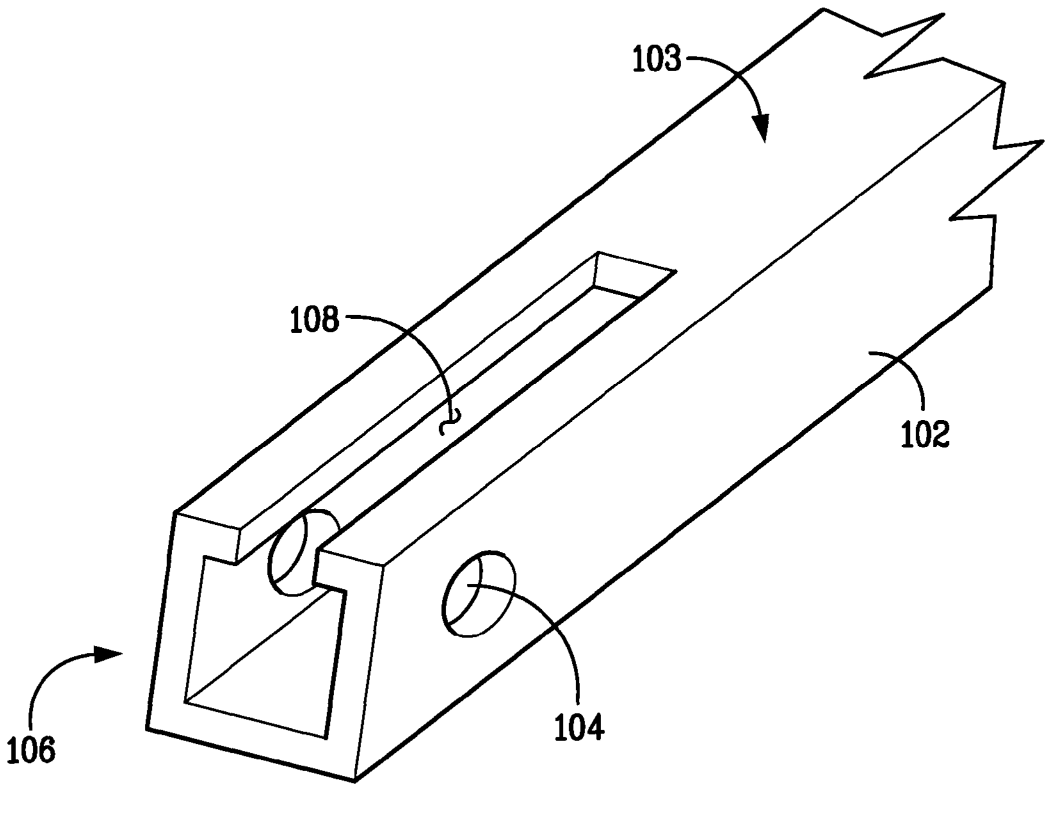
FIG. 12 shows an isometric view of an example of a harpoon support shaft.

FIG. 12 shows an example of a harpoon support shaft, according to the present invention. Shaft 102 has a hollow, square cross-section with a long slot 108 cut into the upper surface 103 of shaft 102; and a hole 104 for holding a pivot pin (not shown). The upper slot 108 accommodates the rotation of the pivot blade (not shown) as it rotates outwards about the pivot pin when released. The width of upper slot 108 is greater than the width of a pivot blade (not shown). The front end of upper slot 108 extends through the front end 106 of shaft 102 (i.e., the slot is open at the front end, and is closed at the back end). The length, L, of upper slot 108 can be at least two-times the length of a side, W, of square channel 102 (i.e., $L \geqq 2 \times W$).

Figure 13:
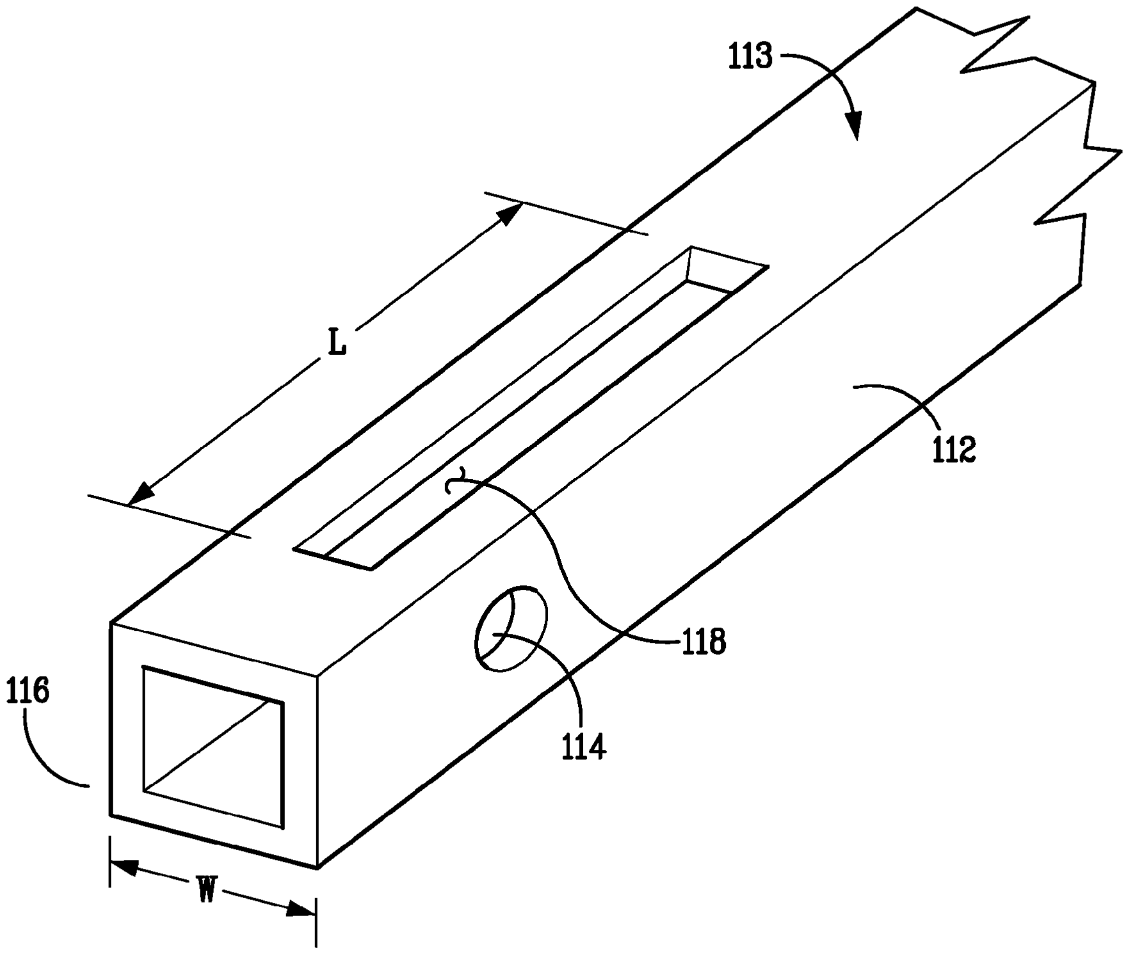
FIG. 13 shows an isometric view of another example of a harpoon support shaft.

FIG. 13 shows another example of a harpoon support shaft, according to the present invention. Shaft 112 has a square, hollow cross-section with a long slot 118 cut into the upper surface 113 of shaft 112, and a hole 114 for holding a pivot pin (not shown). The upper slot 118 accommodates the rotation of the pivot blade (not shown) as it rotates outwards about the pivot pin when released. The width of upper slot 118 is greater than the width of a pivot blade. The front end of upper slot 118 does not extend through the front end 116 of shaft 112. In other words, the upper slot 118 is closed at both ends. The length, L, of upper slot 118 can be at least 2 times the length, W, of the side of square channel 112 i.e., $L \geqq 2 \times W$.

Figure 14:
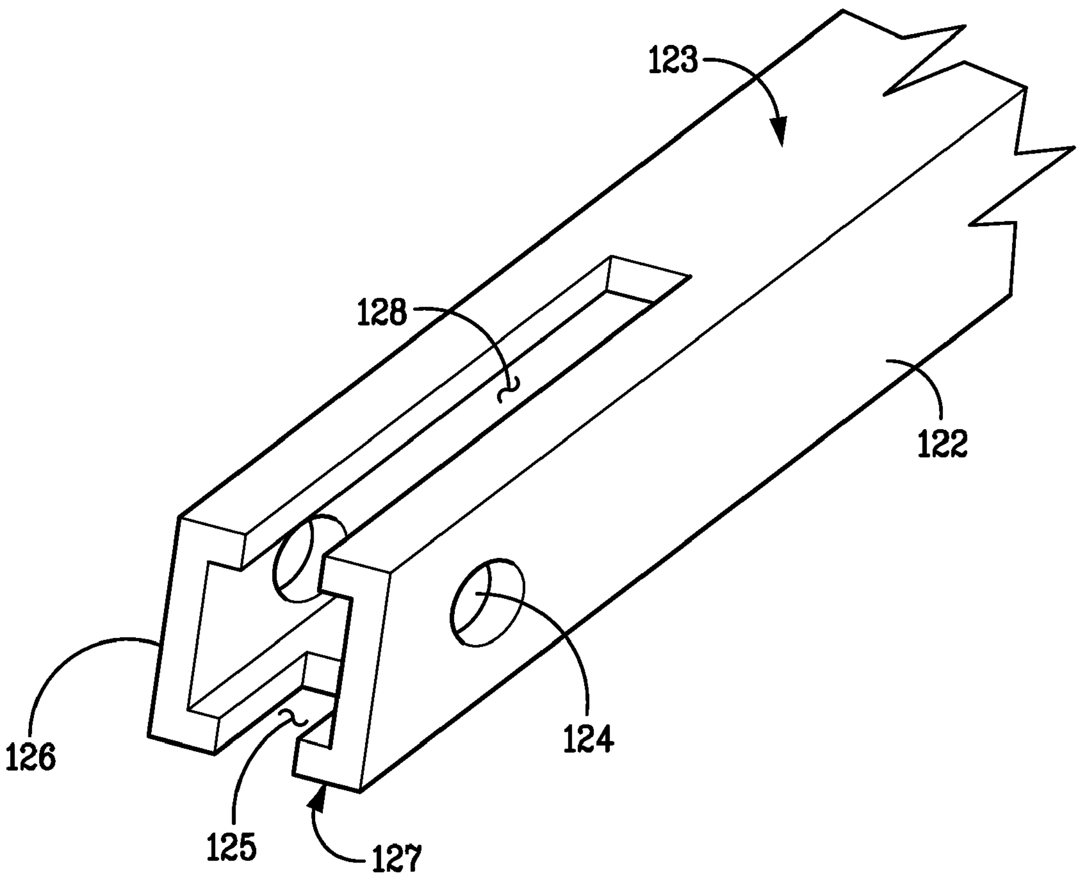
FIG. 14 shows an isometric view of another example of a harpoon support shaft.

FIG. 14 shows another example of a harpoon support shaft, according to the present invention. The embodiment of FIG. 14 is the same as in FIG. 12, except that a second, lower slot 125 has been cut into the lower surface 127 of square shaft 122. The lower slot 125 allows a pivot blade (not shown) to completely pivot a full 90 degrees (i.e., into a vertical position) around the pivot pin in hole 124. The width of lower slot 125 is greater than the width of a pivot blade (not shown). The front end of lower slot 125 extends through the front end 126 of shaft 122 (i.e., the lower slot 125 is open at the front end). The length of lower slot 125 is at least as long as needed to allow a pivot blade to completely pivot 90 degrees into a position that is perpendicular to the long axis of the support shaft 122.

Figure 15A:
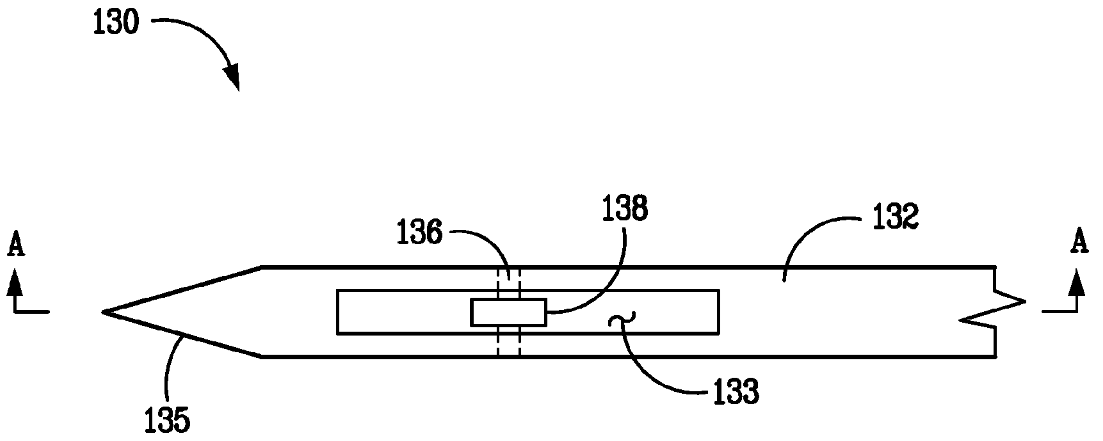
FIG. 15A shows a top view of another example of a harpoon breaching tool.

FIG. 15A shows a top view of another example of a harpoon breaching tool, according to the present invention. Harpoon tool 130 comprises a solid square or rectangular bar 132, with a tapered, pointed tip 135, a through-slot 133, a hinge pin 136 and a pivot blade 138. The sliding collar is not shown.

Figure 15B:
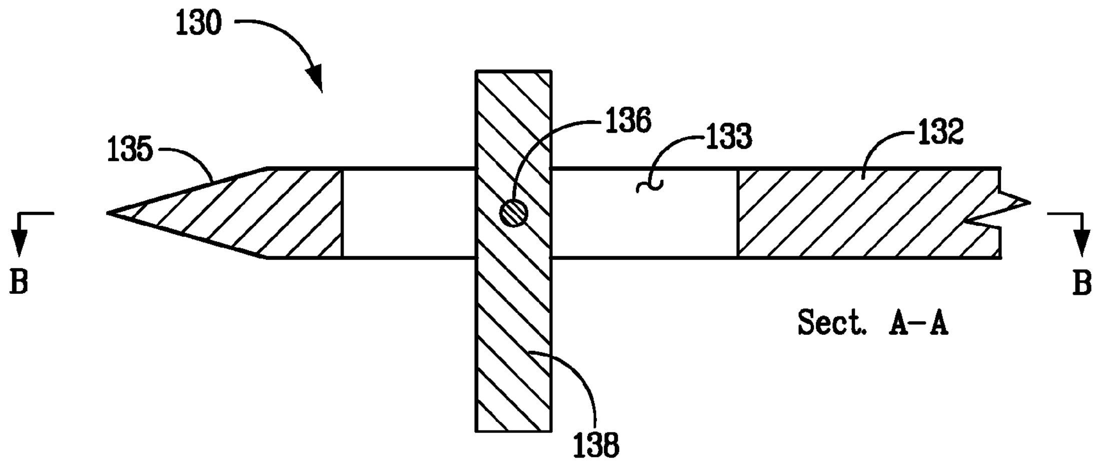
FIG. 15B shows a cross-section side view, A-A, of the harpoon of FIG. 15A.

FIG. 15B shows a cross-section side view of FIG. 15A. The longitudinal opening (slot) 133 passes completely through bar 133 from top to bottom. In this example, the location of pivot pin 136 is offset forwards from the center-of-gravity of the blade 136, which rotates into a vertical locking position by gravity. In FIG. 15B, blade 138 is shown in the deployed, locking position. Slot 133 can be manufactured, e.g., by an Electro-Discharge Machining (EDM) cutting process, water-jet cutting, e-beam cutting, or laser-beam cutting process.

Figure 15C:
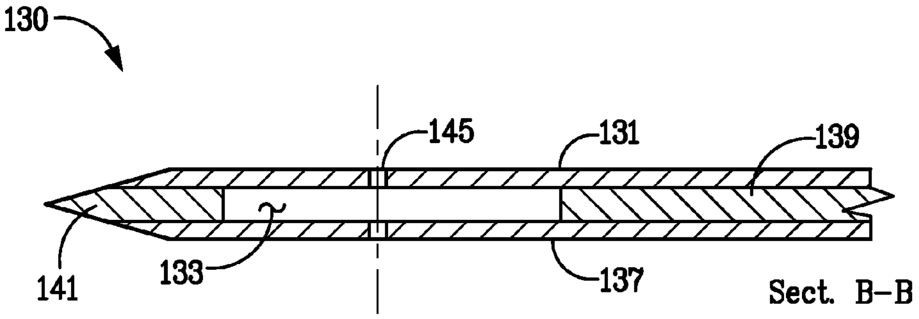
FIG. 15C shows a cross-section top view, B-B, for an alternative construction of FIG. 15A.

FIG. 15C shows a cross-section top view for an alternative construction for FIG. 15A. Harpoon tool 130 can be a laminated structure, made by laminating together multiple bars and pieces of metal. Side plates 131 and 137 are joined to spacer places 141 and 139. Gap/slot 133 is naturally formed by spacer plates 139 and 141. Pivot hole 145 goes through both side plates 131 & 137. In FIG. 15C, the tapered tip can have the same taper angle for both side plates 131 and 137, and the middle spacer plate 141, so as to provide smooth and efficient penetration through a door or wall. Lamination of the plates can be done by welding around the edges, either continuously or intermittently (by hand, or e-beam weld, laser weld, or by machine welding); by brazing or soldering the plates together; by gluing (e.g., cyanoacrylate adhesive, epoxy-based adhesive, or other glues well known in the composites fabrication industry), by riveting, by screwing together, etc. Rivets can be flush or raised head. The rivets can be steel rods that are welded at each end to a countersunk region of the outer plates 131 and 137.

Figure 15D:
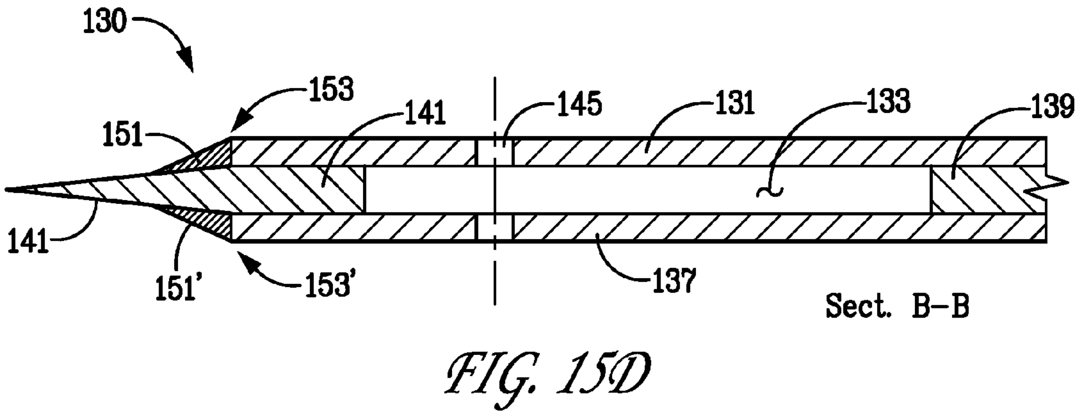
FIG. 15D shows a cross-section top view, B-B, for an alternative construction similar to FIG. 15C.

FIG. 15D shows a cross-section top view for an alternative laminated construction similar to FIG. 15C. In this example, the front butt ends (e.g., 153, 153') of side plates 131 and 137 are flat. A pair of weld joints 151, 151' are made at the 90 degree intersection of the butt end 153, 153' of the side plates and the middle (spacer) plate 141. A large, angled weld bead 151, 151' can provide a relatively smooth transition from the tapered tip of plate 141, past the blunt ends 153, 153' of side plates 131 and 137.

Figure 16A:
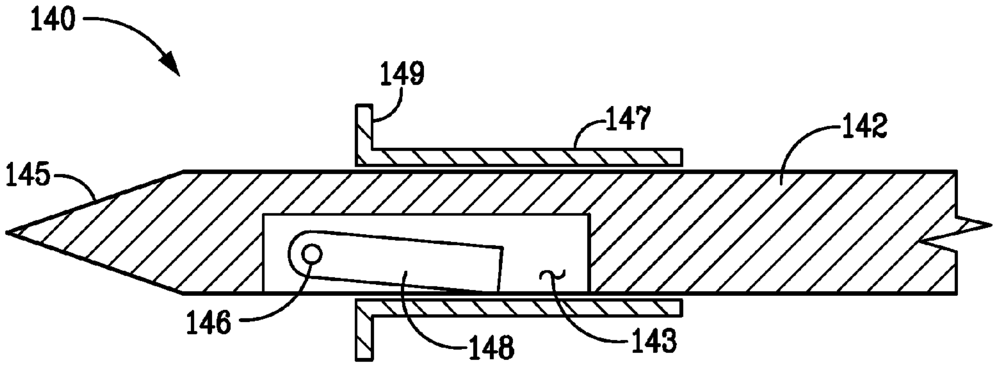
FIG. 16A shows a cross-section side view of another example of a harpoon breaching tool.

FIG. 16A shows a cross-section side view of another example of a harpoon breaching tool. Tool 140 comprises a solid bar 142 with a tapered tip 145, a recessed slot 143, a pivot pin 146, and a pivot blade 148. Bar 142 can have a solid square, rectangular, or circular cross-section. Pivot pin 146 is mounted near the front end of blade 148, which rotates by gravity into a substantially-vertical locking position when released by the sliding collar (not shown). In this embodiment, recessed slot 143 does not completely go through to the other side of bar 142 (as in, for example, FIG. 15A). Pivot blade 148 is shown in the un-released position, disposed inside the recessed slot 143 inside of support shaft 142. Sliding collar 147 with flange or tabs 149 is located so that the collar covers at least part of blade 148, thereby holding blade 148 in the un-released position.

Figure 16B:
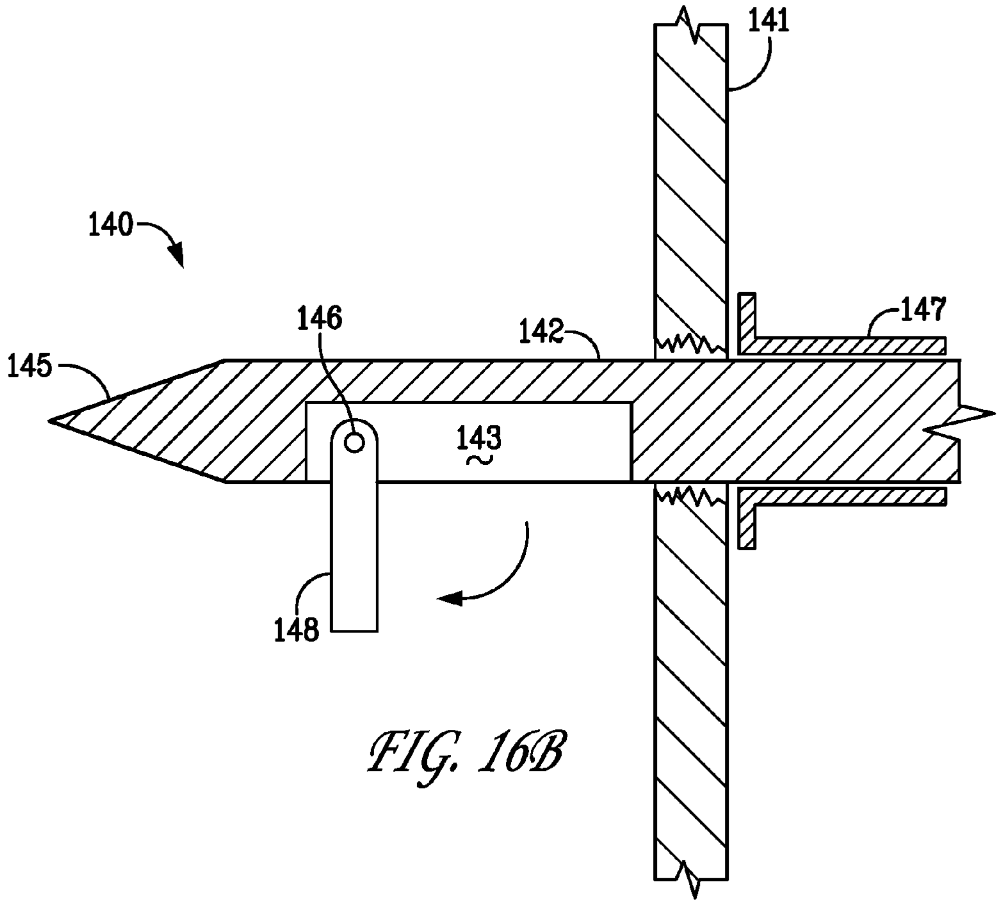
FIG. 16B shows a cross-section side view of the example of FIG. 16A.

FIG. 16B shows a cross-section side view of the harpoon breaching tool of FIG. 16A, after penetrating through a metal door. Here, sliding collar 147 has been pushed backwards by door 141 as the harpoon 140 passes through the penetration made in the door by tapered tip 145. Pivot blade 148 has been released, and rotated by gravity into a vertical position, roughly perpendicular to the harpoon's centerline. Blade 148 is also roughly parallel to the plane of the metal door or wall 141.

Figure 17A:
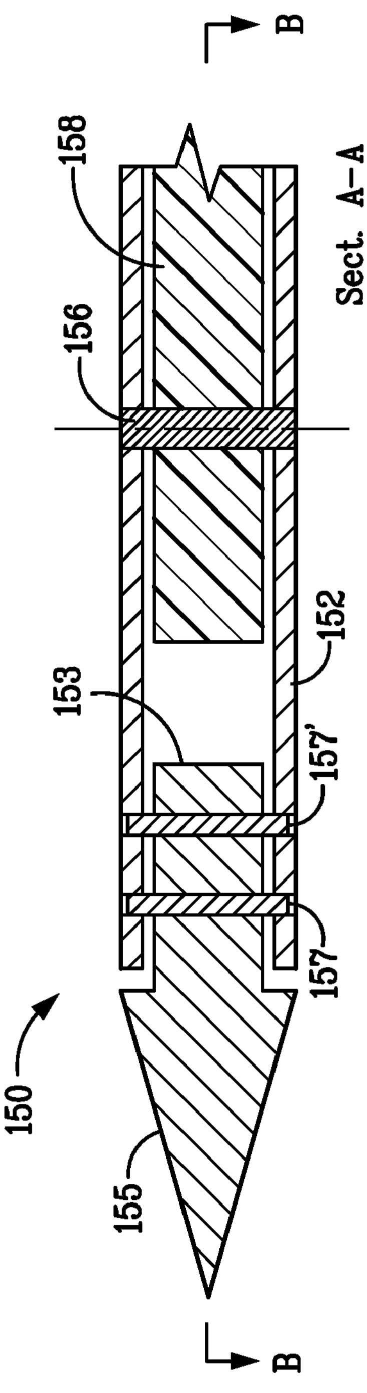
FIG. 17A shows a cross-section top view, A-A, of another example of a harpoon breaching tool.
Figure 17B:
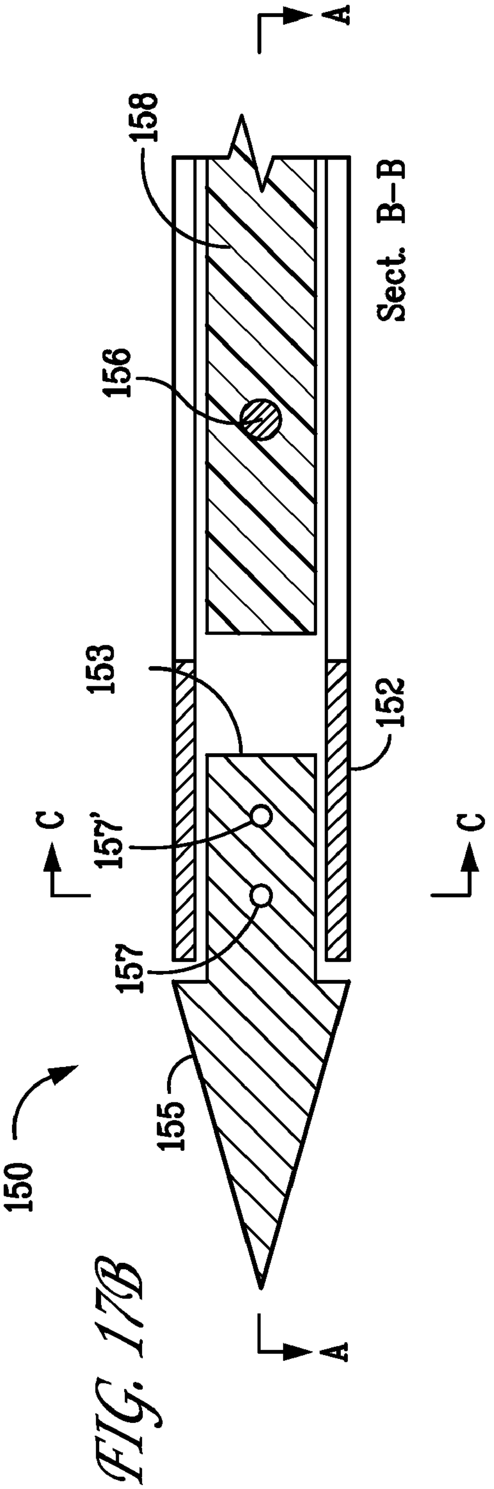
FIG. 17B shows a cross-section side view, B-B, of the harpoon of FIG. 17A.
Figure 17C:
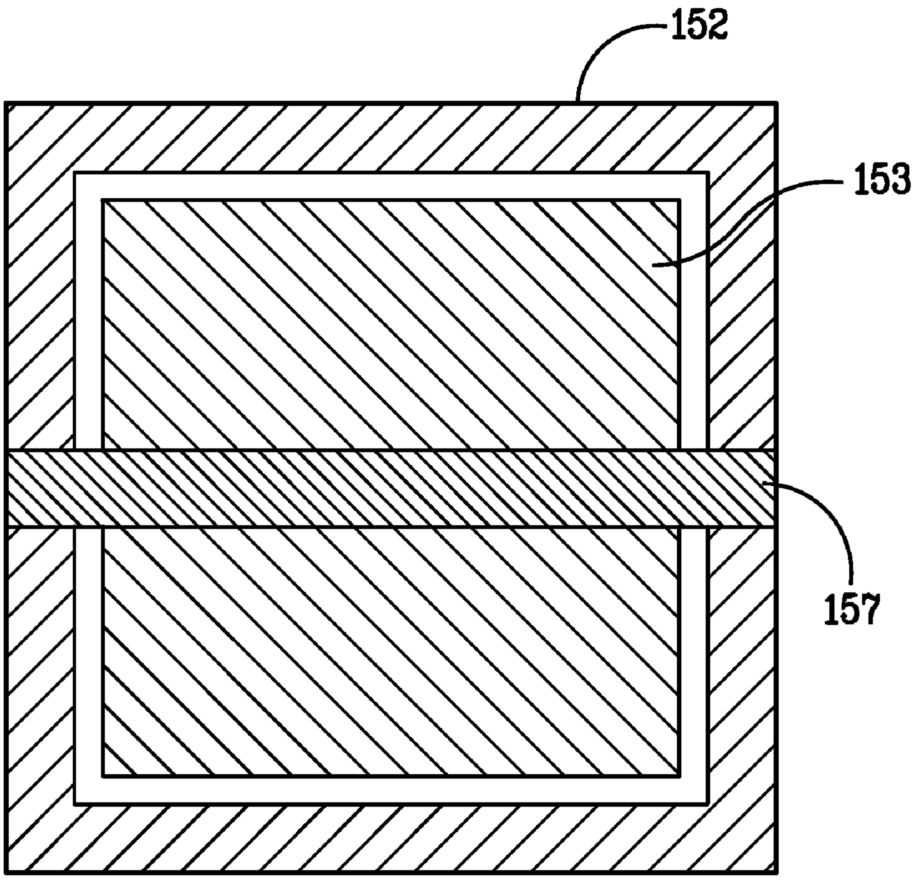
FIG. 17C shows a cross-section end view, C-C, of the harpoon of FIG. 17A.

FIG. 17A shows a cross-section top view, A-A, of another example of a harpoon breaching tool. Tool 150 has a hollow support shaft 152, pivot blade 158, hinge pin 156, and a tapered tip 155 for piercing. Tip 155 is a separate, solid, "arrowhead"-like plug, with a reduced-width shank 153 that fits snugly into the front end of hollow shaft 152. Tip 155 can be joined to shaft 152 with a one or more industrial pins 157, e.g., a coiled spring pin or dowel pin. If tip 155 needs replacing, then the industrial pins 157 are easily knocked out or otherwise removed. FIG. 17B shows a cross-section side view, B-B of the tool of FIG. 17A. FIG. 17C shows a cross-section end view, C-C, of the tool of FIG. 17A. Shaft 152 and the shank 153 of tip 155 can have a square cross-section, as in this example; or be circular, rectangular, etc (as presented earlier).

Figure 18A:
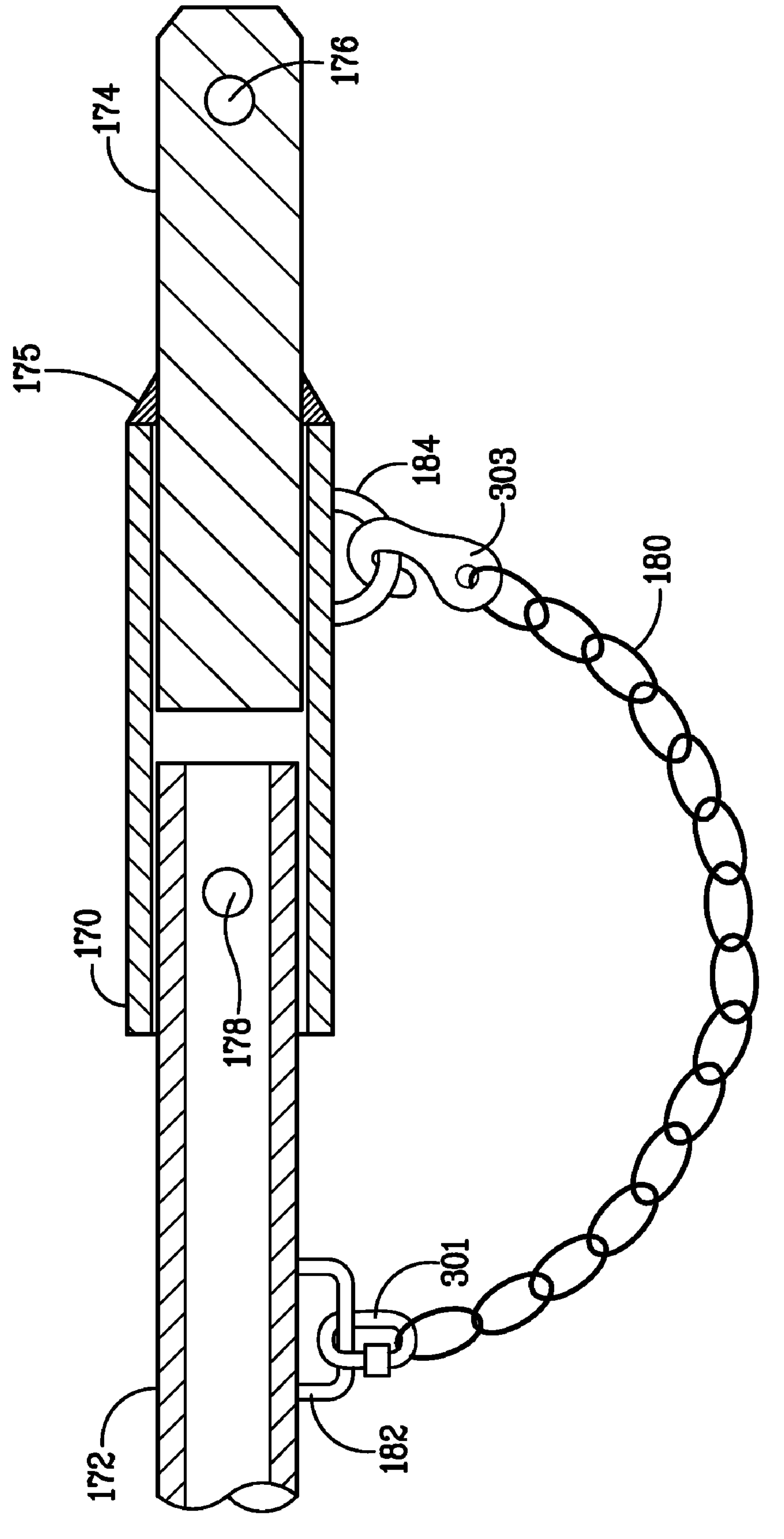
FIG. 18A shows a cross-section side view of a trailer hitch adaptor.

FIG. 18A shows a cross-section side view of an adaptor 170 for making a transition from the support shaft 172 to a square bar 174 for inserting into a trailer hitch receiver (not shown). Adaptor 170 is a hollow channel, with a square tongue 174 welded to the channel by weld 175. Tongue 174 has a thru-hole 176. Tongue 174 can have a solid or hollow cross-section. The harpoon's support shaft 172 inserts into the open end of adaptor 170, and can be temporarily or permanently attached by using a weak or strong pin through hole 178, (or, alternatively, no pin joint at all). A first metal loop 182 is welded to the underside of shaft 172, and a second metal loop is welded to the underside of adaptor 170. A slack, metal chain 180 is connected between the two metal loops 182 and 184. Means for connecting the chain 180 to loops 182 and 184 include a locking, or non-locking, steel carabiner 301, a strong hook 303, a clevis pin, etc.

Figure 18B:
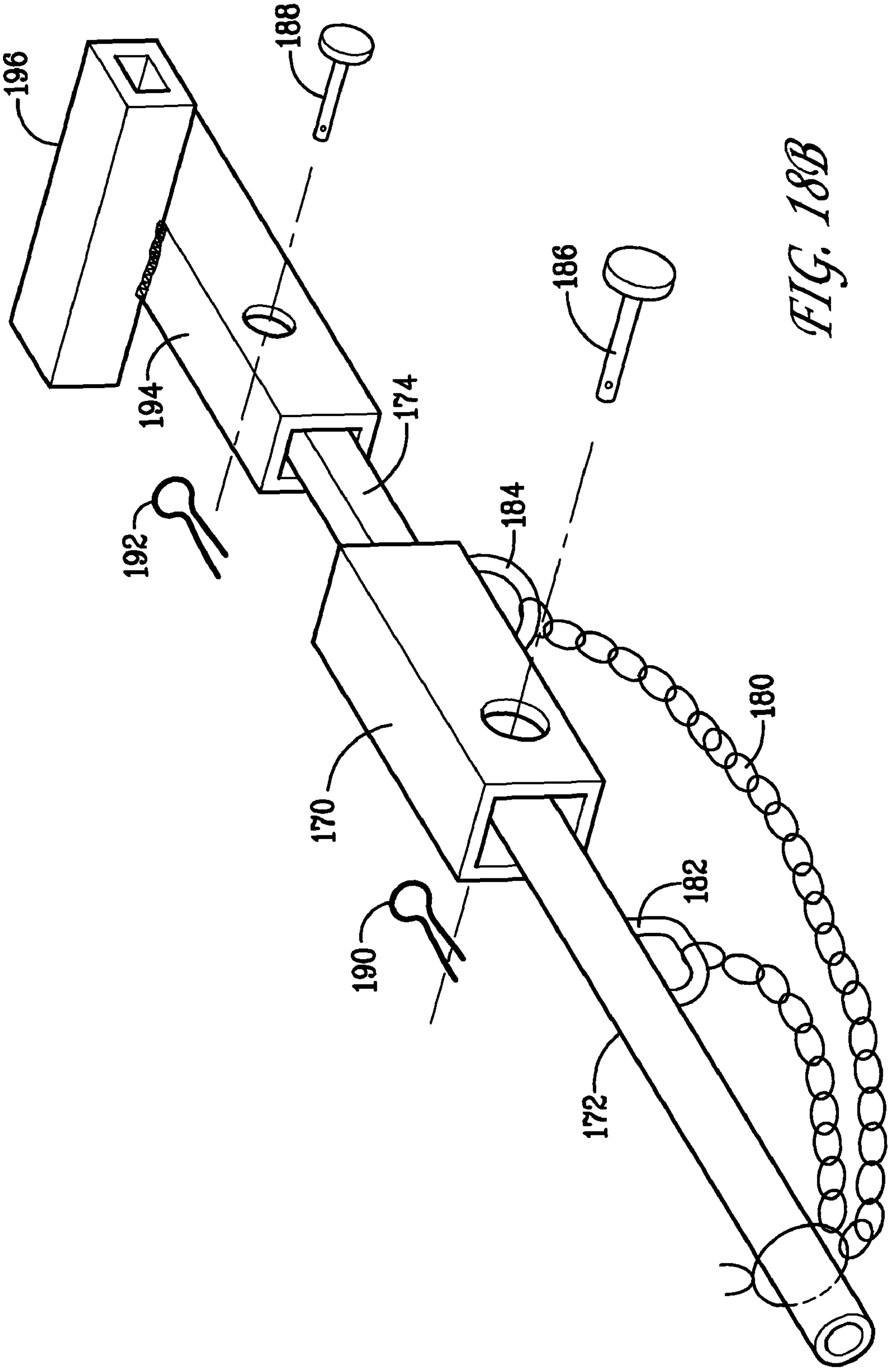
FIG. 18B shows an isometric view of a trailer hitch adaptor.

FIG. 18B shows an isometric 3-D view of a harpoon support shaft 172 mounted to a trailer hitch 194, using adaptor 170. In this assembly, support shaft 172 is inserted into the front, open end of adaptor 170, and is locked in place by shear pin 186. At the back end of adaptor 170, welded tongue 174 is inserted into a standard trailer hitch receiver 194 (e.g., 2" hitch), and securely attached together with an industrial pin 188. Channel section 170 may be any of the cross-section shapes listed before, such as square, circular, rectangular, U-shaped, etc. It is not required for the channel shape of adaptor 170 to have the same shape as shaft 172. For example, as shown in FIG. 18B, channel 170 has a square cross-section, and shaft 172 has a circular cross-section. A slack, heavy metal chain 180 is connected between loop 182 on shaft 172 and loop 184 on adaptor 170. Trailer receiver hitch 194 is welded to the structural frame 196 of a truck or other vehicle (not shown). Either, or both, pins 186 and 188 may be secured from falling out by, e.g., using cotter pins 190 and 192, respectively. Pin 186 can be a shear pin made of a sacrificial, breakable material (e.g., plastic, wood, small diameter steel) and/or have a small diameter, that shears (breaks) relatively easily when the shaft 172 is pulled away from adaptor 170. After the harpoon has penetrated and hooked the door, and the pivot blade released, the vehicle reverses direction and drives away from the door. When the released pivot blade contacts the inside of the door, the moving vehicle pulls apart shaft 172 and adaptor 170 by breaking shear pin 186. Then, as the vehicle continues to drive away, increasing the distance between the embedded harpoon and the truck, the chain 180 eventually snaps tight, thereby applying a large impulse force (i.e. "jerk") to the harpoon by the momentum of the moving vehicle. Adaptor tongue 174 is securely pinned with pin 188 to the vehicle's receiver hitch 194, so that the adaptor 170 remains attached to the hitch 194 when the chain snaps tight. Optionally, slack chain 180 can be bundled or loosely coiled up underneath adaptor 170 and shaft 172 with one or more weak ties 191 (e.g., plastic cable ties), to keep the chain from dragging the chain on the ground and accidentally catching on something.

Alternatively, chain 180 may be tied-up underneath the trailer hitch 194 with plastic cable ties. It is not required to actually use a shear pin 186 to temporarily connect shaft 172 to adaptor 170. Instead, the connection can simply by a slid-in, friction fit; which is sufficient keep the shaft 172 from accidentally falling out of adaptor 170 while being driven around. During penetration, the back end of shaft 172 butts up against the front end of tongue 174 and is supported. Then, after hooking the door, the shaft 172 simply pulls out of adaptor 170 and falls to the ground, when the vehicle drives backwards. Alternatively, adaptor 170 can be designed to fit snugly over the tine of a fork lift.

Figure 18C:
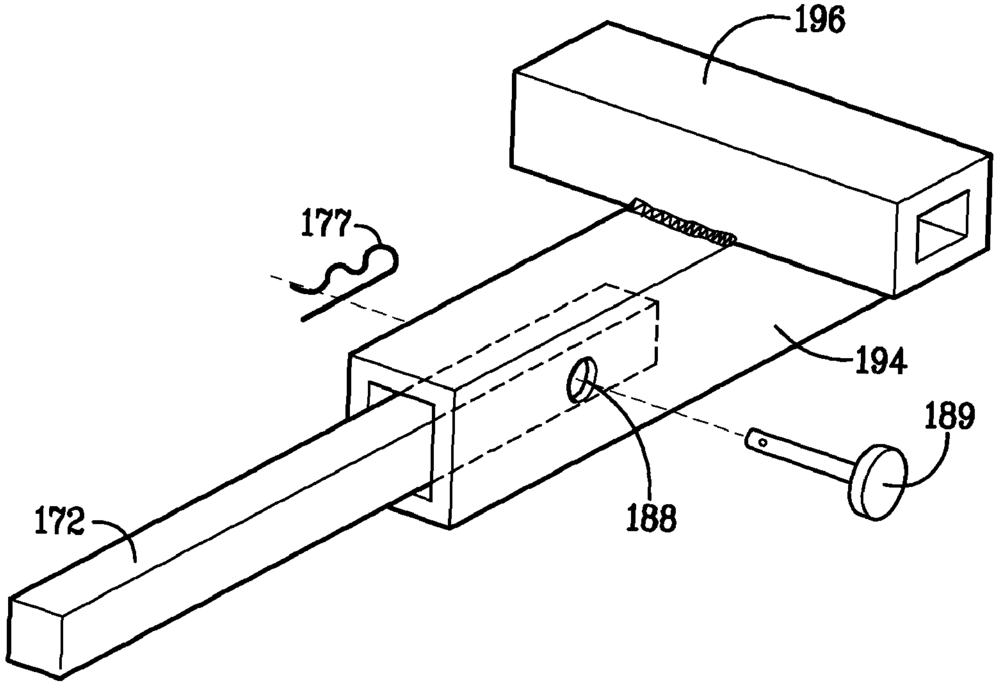
FIG. 18C shows an isometric view of a harpoon shaft mounted to a trailer hitch.

Alternatively, as shown in FIG. 18C, the harpoon's support shaft 172 can be inserted directly into trailer receiver hitch 194 and connected by pin 188 and cotter pin retainer 177. Shaft 172 can be a 2" square channel (hollow or solid), which fits snugly into a standard 2" trailer receiver hitch 194. If a slack chain is used (not shown), then pin 188 can be a weak pin, i.e., a shear pin, designed to break at a low force. Otherwise, if a slack chain is not used, then pin 188 can be a strong (i.e., essentially unbreakable) pin.

Figure 18D:
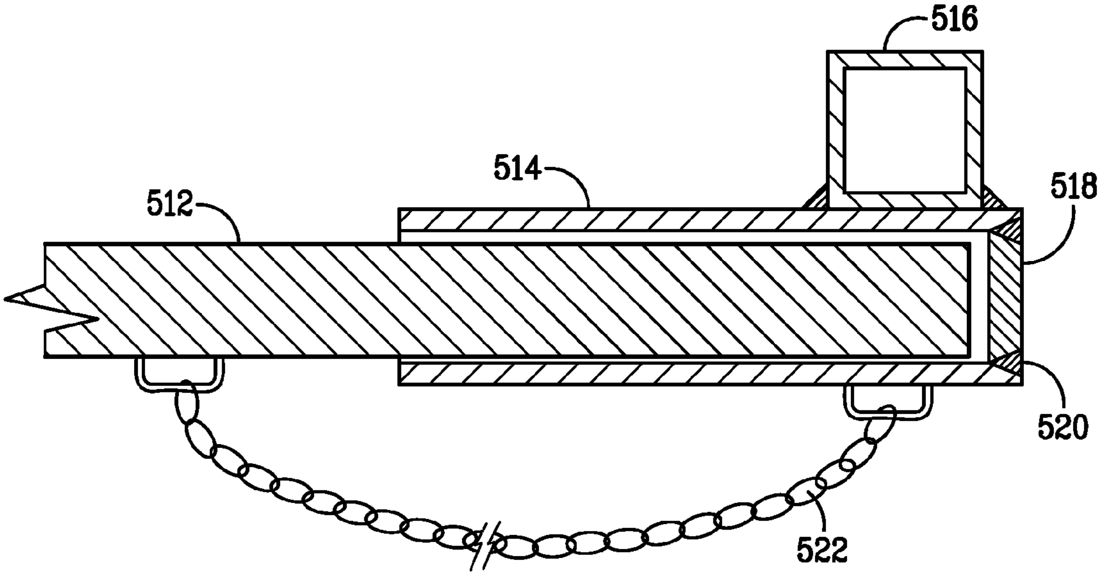
FIG. 18D shows side cross-section view of a harpoon shaft mounted to a modified trailer hitch.

FIG. 18D shows a cross-section of a first example of a modified trailer receiver hitch. The square receiver tube 514 has been modified by welding an "end-stop" back plate 518 onto the back end of the tube with weld 520. This prevents harpoon support shaft 512 from being pushed out the back of receiver tube 514 when the harpoon is penetrating the door, but also allows shaft 512 to be easily pulled out and detached from the hitch (since the shaft is not pinned), thereby allowing the vehicle to gain momentum prior to snapping chain 522 tight.

Figure 18E:
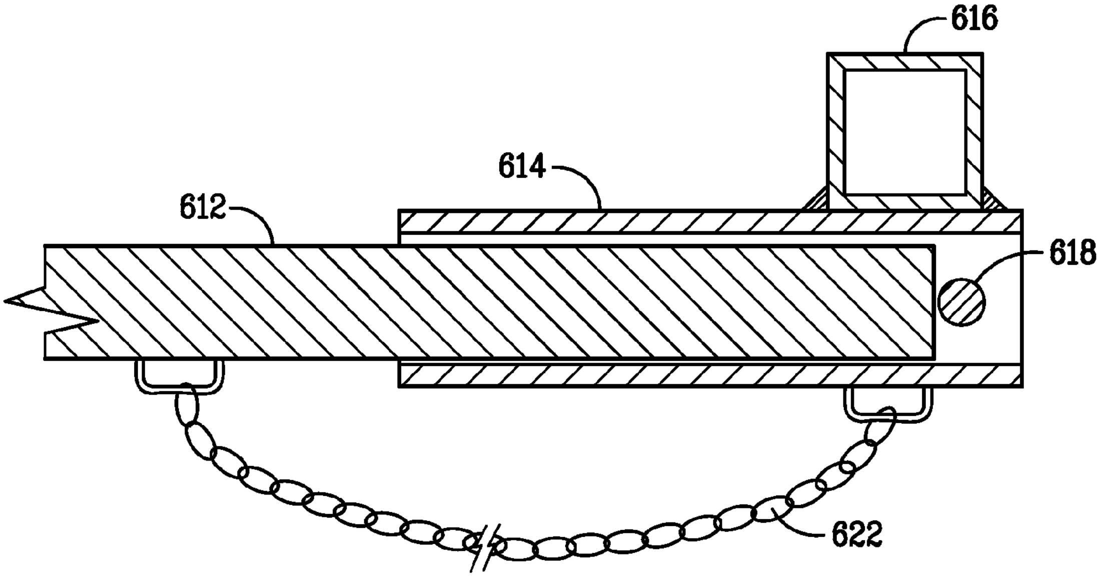
FIG. 18E shows side cross-section view of a harpoon shaft mounted to a modified trailer hitch.

FIG. 18E shows a cross-section of another example of a modified trailer receiver hitch. The square receiver tube 614 has been modified by drilling a second thru-hole 618 for accepting a strong pin. The second thru-hole 618 is located towards the rear end of receiver tube 614. When a strong pin and clip is placed into the second thru-hole 618, then this serves as an "end-stop" for preventing harpoon support shaft 612 from being pushed out the back of receiver tube 614 when the harpoon impacts and penetrates the door. But, since shaft 612 is not pinned to the hitch 614, then this also allows shaft 612 to be easily pulled out of receiver tube 614, and separated from the vehicle; thereby allowing the vehicle to gain momentum prior to snapping chain 622 tight.

Optionally, the rear end of the chain (e.g., chain 622 in FIG. 18E), can be attached to a conventional "tow hook" that is commonly bolted to the structural frame of a car or truck.

Figure 18F:
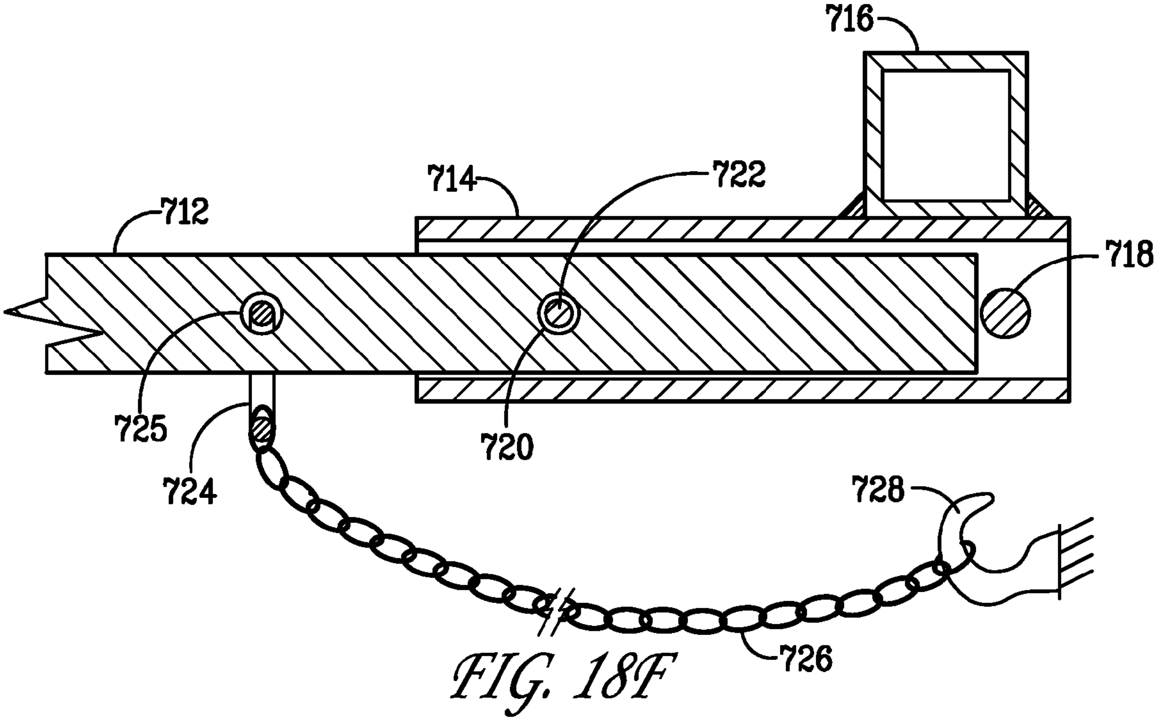
FIG. 18F shows side cross-section view of a harpoon shaft mounted to a modified trailer hitch.

FIG. 18F shows a cross-section of another example of a modified trailer receiver hitch. As before in FIG. 18D, square receiver tube 414 has been modified by drilling a second thru-hole 718 for accepting a strong pin and clip. The second thru-hole 718 is located towards the rear end of receiver tube 714. When a strong pin and clip is placed into the second thru-hole 718, then this serves as an "end-stop" for preventing harpoon support shaft 612 from being pushed out the back of receiver tube 714 when the harpoon impacts and penetrates the door. Additionally, a weak shear pin 720 is placed in the standard pin hole 722 for a standard receiver tube. After the harpoon has penetrated and hooked the door, and then the vehicle begins to drive backwards away from the door, the weak shear pin 720 breaks, thereby allowing shaft 712 to be easily pulled out of receiver tube 714 and separated from the vehicle; thereby allowing the vehicle to gain some momentum prior to snapping the chain 726 tight. Note that in this example, chain 726 is attached to a clevis pin 724 attached to a hole 725 in shaft 712; and chain 726 is also hooked onto hook 728 (which is attached to the frame of the vehicle).

Figure 18G:
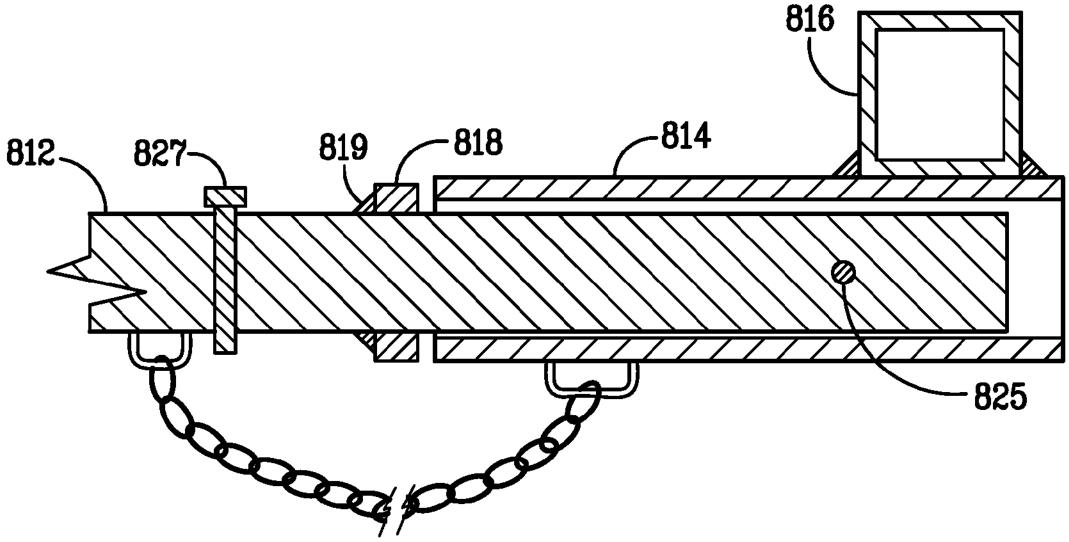
FIG. 18G shows a cross-section of another embodiment of a harpoon mounted to a trailer hitch.

FIG. 18G shows a cross-section of another embodiment of a harpoon mounted to a trailer hitch. Support shaft 812 is inserted into trailer receiver tube 814, and optionally pinned with a weak, shear pin 825. A slack chain 822 can be hung between the shaft 812 and hitch 814. Hitch 814 is welded to the truck's structural frame 816. A one-way "stopper" member(s) 818 is welded with weld 819 to shaft 812. Stopper 818 may be one, two, three, or four, short bars of metal, e.g., ½"×½"×2". Alternatively, in place of stopper 818, a hole can be drilled in shaft 812 and a large diameter bolt 827 and nut can be installed to serve as a one-way stopper. The purpose of stopper 818 (or 827) is to rigidly hold shaft 812 while penetrating the door or wall, while not interfering with the detachment of shaft 812 from receiver tube 814 when the truck drives away from the door or wall (after penetration and hooking).

Figure 19:
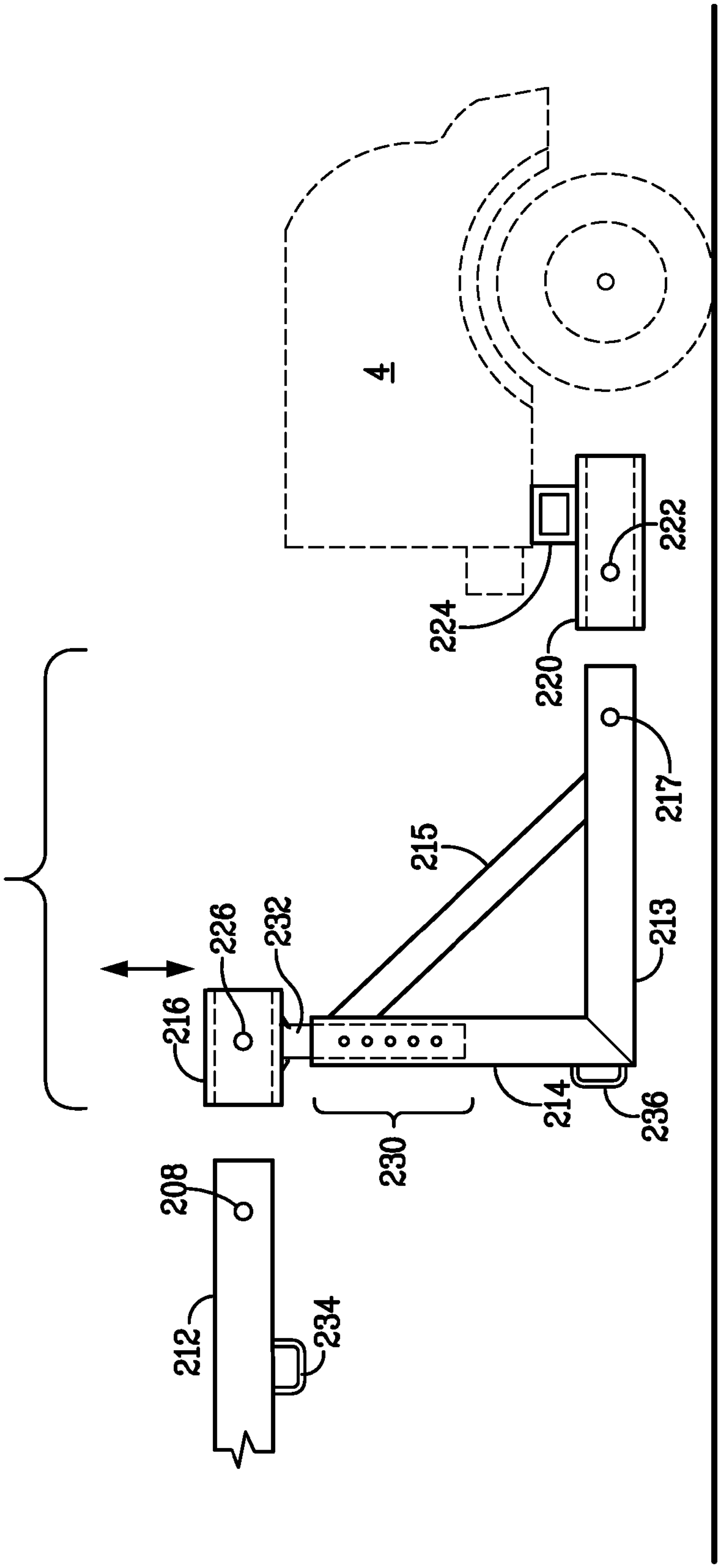
FIG. 19 shows a side view of an adjustable-height triangular adaptor bracket.

FIG. 19 shows an elevation view of an adjustable-height triangular adaptor bracket. Bracket 210 can optionally used to mount the harpoon's support shaft 212 about 2-4 feet high off then ground, so that the harpoon's tip can impact and penetrate the door or wall at roughly mid-height (instead of penetrating the door at a height of only about 1-2 foot. Bracket 210 can be made in a wide variety of ways. For example, bracket 210 can comprise two channels 213 and 214 welded at right angle, with an angled (e.g., 45 degrees) channel 215 welded to make a rigid triangular frame. Channels 213 and 214 can be 2" hollow, square channel. Channel 213 fits into trailer receiver hitch 220, and is rigidly pinned through holes 217 and 222. Hitch 220 is welded to structural frame 224. Channel 215 can be a T or U-shaped structural channel. Bracket 210 also comprises a hollow channel 216 with a through hole 226. Channel 216 is welded to an adjustment stem 232, which is locked into place inside of hollow channel 214 with an industrial pin and clip. The vertical height of channel 216/stem 232 may be adjusted up or down through a series of vertically-stacked holes 230. Alternatively, channel 216 may be welded directly to the top of channel 214 (in which case, an adjustment stem 232 would not be needed). The rear end of support shaft 212 is mounted inside of hollow channel 216, and is pinned together through holes 208 and 226. The pin holding together shaft 212 and channel 216 may be weak (i.e., a shear pin), or strong (unbreakable). If a weak shear pin is used, a bundled-up, slack chain (not shown) may be attached to loop 234 on shaft 212 and to loop 236 on bracket 210.

The support shaft, 132 or 142, shown in any of FIGS. 15A & 15B or 16A & 16B, may comprise a bar or rod of solid metal (i.e., having a solid cross section). In these embodiments, the tapered tip (135 or 145, respectively) may be an integral part of the solid shaft 132 or 142. In other words, the tapered tip is made from the solid shaft, e.g., by grinding or turning a taper onto the blunt end of the solid bar or rod.

Another embodiment of the present invention is harpoon breaching kit. For example, a kit may comprise the following parts:

- a harpoon breaching tool, any one as described earlier;
- a flexible connecting member, having a front end and a back end;
- means for connecting the rear end of the harpoon's support shaft to the front end of the flexible connecting member;
- means for connecting the rear end of the flexible connecting member to the structural frame of a vehicle, and
- means for temporarily connecting the rear end of the harpoon's support shaft to the vehicle's structural frame.

The flexible connecting member may be a metal chain, a towing strap, or a steel cable. The means for connecting the rear end of the harpoon's support shaft to the front end of the flexible connecting member, and the means for connecting the rear end of the flexible connecting member to the structural frame of a vehicle including a locking or non-locking steel carabiner, a strong hook, clevis pin, etc. The means for temporarily connecting the rear end of the harpoon's support shaft to the vehicle's structural frame can comprise a weak, breakable, shear pin; and also can comprise a slip-on, one-way friction fit that holds the harpoon rigidly when the vehicle is driving towards the door and while penetrating the door, but allows the harpoon to be detached from the vehicle when pulled backwards away from the vehicle.

Test Results

We performed full-scale, realistic breaching tests, using the harpoon design of FIGS. 6A, 6B and 6C. We used 3" schedule 80 steel pipe for pipe 12. The sliding collar was made of 3½" schedule 40 steel pipe. The blade was made of 1"×3" bar stock, with a 30 degree tapered tip. The length of the blade from the tip to hinge pin 16 was 15 inches, and the length from hinge pin to rear end of the blade was 10 inches, so that the total length of the blade was 25 inches. The hinge pin was a 1"×2.5" long grade 8 hex bolt with 12UNF threads. The length of collar 14 was 12 inches, and a 5" diameter threaded ring was screwed onto the front end of the collar. The bolt head and other end of hinge pin 16 was recessed below the surface of pipe 12.

Figure 7A:
FIG. 7A shows a picture of a prototype harpoon, mounted on a trailer hitch of a truck, in the un-released position.
Figure 7B:
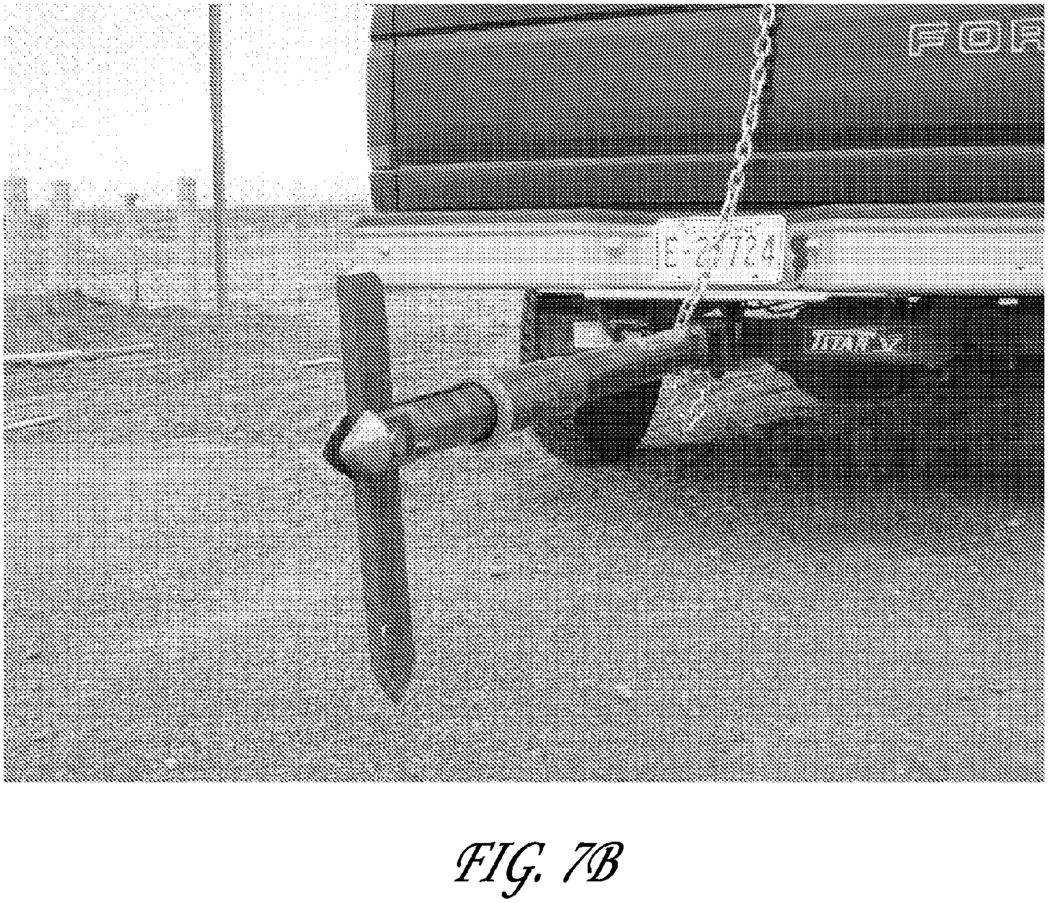
FIG. 7B shows a picture of a prototype harpoon, mounted on a trailer hitch of a truck, in the released position.
Figure 8A:
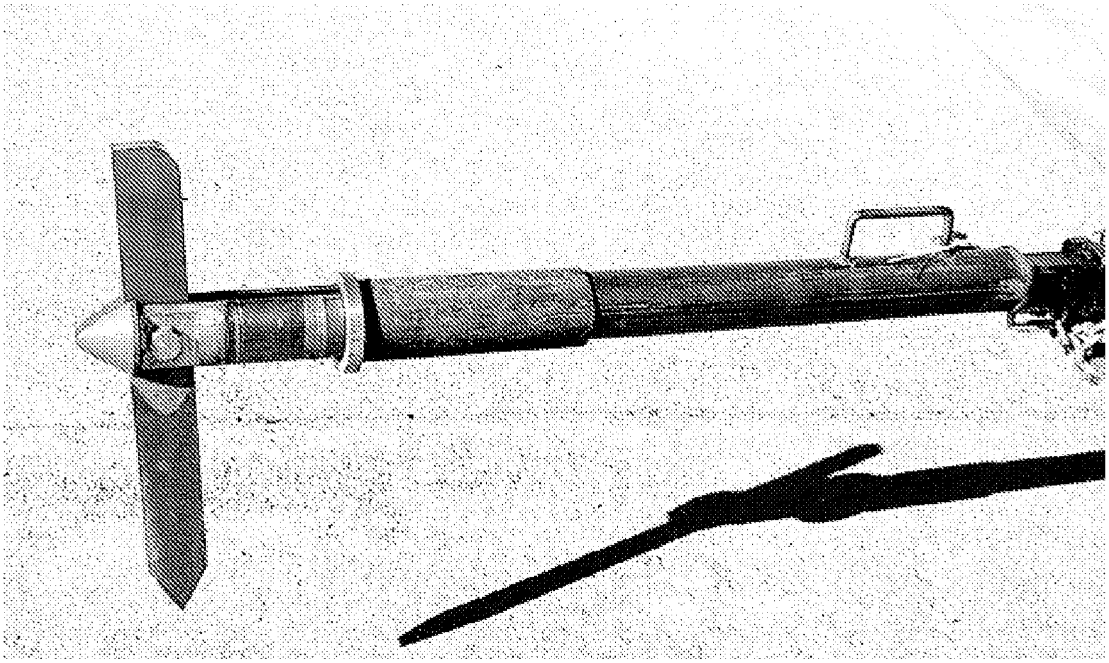
FIGS. 8A and 8B show pictures of the same harpoon as FIG. 7, with the collar slid backwards, and the blade released.
Figure 8B:
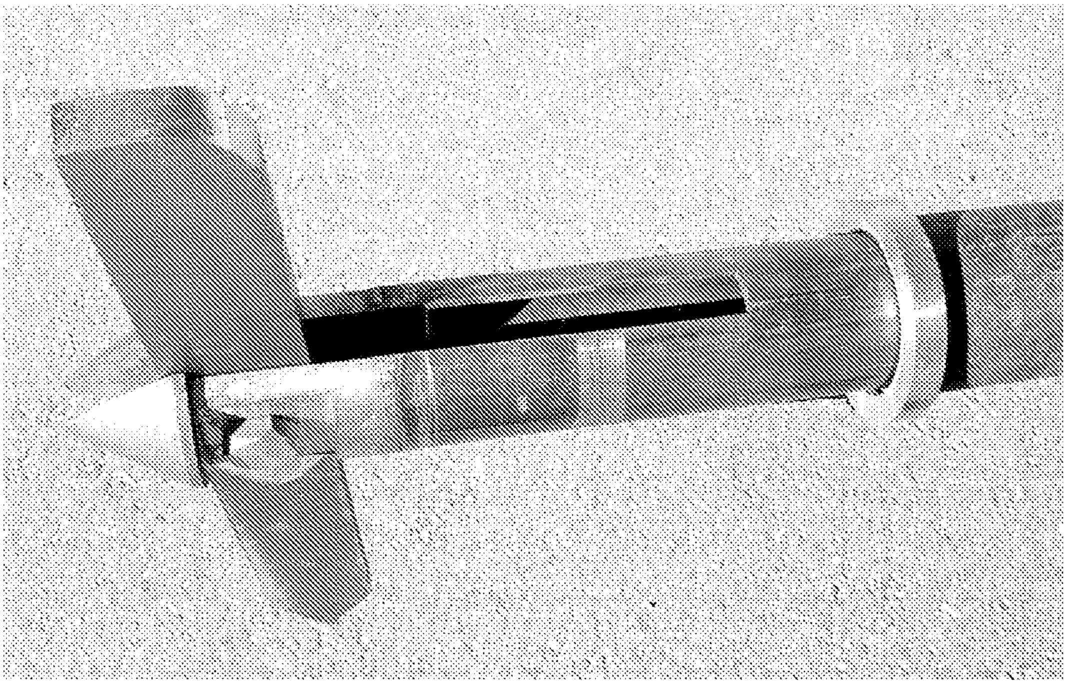

FIG. 7A shows a picture of the prototype harpoon, mounted on a trailer hitch of a truck, in the un-released position. FIGS. 7B, 8A and 8B show the same harpoon as FIG. 7, after the collar has slid backwards and the blade released to rotate into a locking position(s). Using this design of a vehicle-mounted harpoon tool, we tested and breached eight doors using the vehicle-assisted method of the present invention. Three were single doors. Five were doubles doors. The doors were part of two types of buildings slated to be demolished: a concrete block building and a wood-frame stud, sheet-metal building. For these tests, the harpoon was attached to a forklift and aimed at the center of the door (except for the last test where it was attached to the receiver hitch of a truck). Timing started when the forklift was approximately 20 feet from the door. The forklift moved forward and pierced the door. After the harpoon penetrated the door sufficiently, it was reversed, and the door was pulled from its hinges. Table 1 summarizes the timed data for these tests.

TABLE 1

Timed data for breaching metal personnel doors with a harpoon in two types of buildings.

| | Concrete Block Building | | | | Wood Frame, Sheet Metal Building | | | | |
|---|---|---|---|---|---|---|---|---|---|
| Event | Single sec. | Double sec. | Double sec. | Double sec. | Double sec. | Single sec. | Single sec. | Single sec. | Average sec. |
| Start test | 0 | 0 | 0 | 0 | 0 | 0 | 0 | 0 | 0 |
| Harpoon contacts door. | 4 | 4 | 3 | 4 | 3 | 2 | 2 | 2 | 3 |
| Push harpoon through | 5 | 6 | 12 | 4 | 4 | 3 | 2 | 4 | 5 |
| Door forced open | 9 | 10 | 18 | 13 | 5 | 4 | 4 | N/A[5] | 9 |
| Door freed from hinges or harpoon pulled back | 10 | 11[1,2] | 20 | 20[1,4] | 10[1,3] | 9[1,4] | 9[1,3,4] | 7[1,5,6] | 12 |

Notes:
[1]Harpoon blade did not release.
[2]Door did not come off hinges.
[3]Door frame detaches from wall.
[4]Doors dangles from frame.
[5]Door did not open.
[6]Test conducted with truck.

As can be seen from the data, breaching with a harpoon was quick, averaging just 9 seconds to force the door opened. In all but one test, the door was successfully forced opened. In six of the tests, the blade of the harpoon did not release, preventing it from locking on the inside of the door. This can be attributed to the fact that shaft of the harpoon at the hinge point flares out. This causes the door to be pushed in, instead of allowing the harpoon shaft to penetrate further, pushing the collar away to release the blade.

When two of the doors were breached in the wood-frame building, the frame was torn from the wood-studded wall. Wood-stud walls generally cannot withstand a significant force to the doorframe, such as that experienced in these tests. The concrete block building supported the doorframes much better.

In the test where the harpoon was mounted to the truck, the harpoon blade did not penetrate far enough to release. The door creased half way up the door. When truck reversed direction, the harpoon simply slid out of the hole. This can be attributed to the weak doorframe and the blunt flare on the shaft of the harpoon.

An improvement to the harpoon design would be to reduce the diameter of the shaft from 3 inches to 1½ inches and add fins just after the tip of the harpoon. The fins will help cut the door skin to allow the 1½ inch pipe to penetrate the door surface and not hang up at the hinge point. Instead of using a 3-inch-wide blade, a small 1-inch-diameter rod with a sharpened tip will penetrate the door skin easier. It can be constructed from standard materials such piping, bar stock, and plate steel. A variation in the design would allow the several sections of the shaft to be added to extend the reach. Also, the device can be made such that the angle of the shaft relative to the hitch can be adjusted enabling the harpoon to be centered on the door.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A harpoon breaching tool kit, comprising:

a harpoon breaching tool comprising:

an elongated support shaft having a front end, a back end, and a centerline;

a sliding collar disposed for sliding forward or backward along the shaft;

a pivot pin, attached to the shaft, and oriented perpendicular to the shaft's centerline; and a pivot blade pivotally connected by the pivot pin to the front end of the shaft; and a tapered tip for piercing through a metal door or wall, and for making a penetration large enough for the support shaft to pass through;

wherein at least some of the blade is disposed inside of the shaft when the blade is held in an un-released position by the sliding collar; and wherein the blade can pivot outwards through a longitudinal opening in the shaft when the sliding collar has slid backwards sufficiently far so as to release the blade;

a flexible connecting member, having a front end and a back end;

means for connecting the rear end of the harpoon's support shaft to the front end of the flexible connecting member;

means for connecting the rear end of the flexible connecting member to the structural frame of a vehicle, and means for temporarily connecting the rear end of the harpoon's support shaft to the vehicle's structural frame.

2. The harpoon breaching tool of claim 1, wherein the support shaft has a cross-sectional shape selected from the group consisting of square, rectangular, circular, oval, triangular, hexagonal, U-shaped, T-shaped, and I-beam shape.

3. The harpoon breaching tool of claim 1, wherein the support shaft has a hollow cross-section.

4. The harpoon breaching tool of claim 1, wherein the support shaft has a solid cross-section.

5. The harpoon breaching tool of claim 1, wherein the support shaft is from 6 to 10 feet long.

6. The harpoon breaching tool of claim 1, wherein the tapered tip comprises a tapered end of the pivot blade.

7. The harpoon breaching tool of claim 4, wherein the tapered tip comprises a tapered front end of the solid support shaft.

8. The harpoon breaching tool of claim 1, wherein the tapered tip comprises a tapered metal plug attached to the front end of the support shaft.

9. The harpoon breaching tool of claim 8, wherein tapered metal plug is attached to the front end of the support shaft by a type of joint selected from the group consisting of a threaded connection, a pinned joint, a welded joint, a brazed joint, a glued joint, a removable joint, and a fixed joint.

10. The harpoon breaching tool of claim 1, wherein the longitudinal opening comprises a first long slot cut into the support shaft.

11. The harpoon breaching tool of claim 10, wherein the first long slot is open at the end of the first slot that is closest to the tapered tip, and is closed at the other end of the first slot.

12. The harpoon breaching tool of claim 10, wherein the first long slot cut is closed at both ends of the first slot.

13. The harpoon breaching tool of claim 1, wherein the taper angle of the tapered tip is from 10 to 30 degrees, as measured from the shaft's centerline.

14. The harpoon breaching tool of claim 1, further comprising a short slot cut into the front end of the support shaft, having sufficient length to allow the pivot blade to rotate at least 90 degrees, relative to the centerline of the shaft, when released.

15. The harpoon breaching tool of claim 10, further comprising a second long slot cut that is closed at both ends, and is located on the opposite side of the shaft from the first long slot.

16. The harpoon breaching tool of claim 12, wherein the first long slot completely passes through the shaft from one side to the other.

17. The harpoon breaching tool of claim 1, comprising three plates of steel laminated together, wherein the shaft comprises the two outer plates, and the tapered tip comprises the middle plate with a tapered front end.

18. The harpoon breaching tool of claim 1, further comprising a spring for urging the pivot blade to rotate outwards when released.

19. The harpoon breaching tool of claim 18, wherein the spring comprises a coil spring slipped over the pivot pin.

20. The harpoon breaching tool of claim 1, wherein the pivot blade is disposed completely inside of the support shaft when held in the un-released position by the sliding collar.

21. The harpoon breaching tool of claim 20, wherein the pivot pin is located towards the front end of the pivot blade, so that the blade pops-out from only one side of the shaft when released.

22. The harpoon breaching tool of claim 15:

wherein the pivot blade is disposed completely inside of the support shaft when held in the un-released position by the sliding collar; and wherein the pivot pin is located near, or at, the center of gravity of the pivot blade;

whereby one end of the blade pops-out from one side of the shaft through the first long slot, and the other end of the blade pops-out from other side of the shaft through the second long slot, when the blade is released.

23. The harpoon breaching tool of claim 1, wherein the tapered tip comprises one or more longitudinal fins.

24. The harpoon breaching tool of claim 23, wherein the tapered tip comprises an upper fin, a lower longitudinal fin, and a pair of side fins, spaced about 90 degrees circumferentially from each other.

25. The kit of claim 1, wherein the flexible connecting member is selected from the group consisting of a metal chain, a steel cable, and a tow strap.

26. The kit of claim 1, wherein the means for temporarily connecting the rear end of the harpoon's support shaft to the vehicle's structural frame comprises a modified trailer receiver tube.

27. The kit of claim 1, wherein the means for temporarily connecting the rear end of the harpoon's support shaft to the vehicle's structural frame comprises an adjustable-height triangular adaptor bracket.

28. A vehicle-assisted harpoon breaching system, comprising:

the harpoon breaching tool of claim 1, mounted to the structural frame of a vehicle.

29. A vehicle-assisted harpoon breaching system, comprising:

a harpoon breaching tool comprising:

an elongated support shaft having a front end a back end, and a centerline;

a sliding collar disposed for sliding forward or backward along the shaft;

a pivot pin, attached to the shaft, and oriented perpendicular to the shaft's centerline; and a pivot blade pivotally connected by the pivot pin to the front end of the shaft; and a tapered tip for piercing through a metal door or wall, and for making a penetration large enough for the support shaft to pass through;

wherein at least some of the blade is disposed inside of the shaft when the blade is held in an un-released position by the sliding collar; and wherein the blade can pivot outwards through a longitudinal opening in the shaft when the sliding collar has slid backwards sufficiently far so as to release the blade;

wherein the harpoon's support shaft is temporarily mounted to the structural frame of a vehicle; and a flexible connecting member, connected to the support shaft of the harpoon tool at one end and connected to the structural frame of the vehicle at the other end, with some slack in the flexible connecting member;

wherein the temporary mount securely holds the harpoon when the vehicle pushes the harpoon through a door or wall and penetrates;

wherein the harpoon detaches and falls away from the vehicle when the vehicle drives away from the door or wall, after the harpoon has penetrated and hooked the door or wall; and wherein the slack in the flexible connecting member allows the vehicle to gain momentum while driving away from the door or wall, prior to applying an impulsive force to the door or wall when the flexible connecting member is pulled tight.

30. The system of claim 29, wherein the flexible connecting member is selected from the group consisting of a metal chain, a steel cable, and a tow strap.

31. A harpoon breaching tool, comprising:

an elongated support shaft having a front end, a back end, and a centerline;

a sliding collar disposed for sliding forward or backward along the shaft;

a pivot pin, attached to the shaft, and oriented perpendicular to the shaft's centerline; and a pivot blade pivotally connected by the pivot pin to the front end of the shaft; and a tapered tip for piercing through a metal door or wall, and for making a penetration large enough for the support shaft to pass through;

wherein at least some of the blade is disposed inside of the shaft when the blade is held in an un-released position by the sliding collar; and wherein the blade can pivot outwards through a longitudinal opening in the shaft when the sliding collar has slid backwards sufficiently far so as to release the blade;

wherein the tapered tip comprises one or more longitudinal fins; and wherein the tapered tip comprises an upper fin, a lower longitudinal fin, and a pair of side fins, spaced about 90 degrees circumferentially from each other; and wherein the upper fin does not extend radially beyond the outer surface of the support shaft, thereby allowing the sliding collar to cover the upper fin when the pivot blade is in the unreleased position; and wherein the circumferential orientation of the four fins, relative to the circumferential orientation of the pivot pin's centerline, is such that the upper and lower fins are oriented perpendicular to the pin's centerline, and that the pair of side fins are oriented parallel to the pin's centerline; and wherein each side fin has a radial extent greater than or equal to ½ of the length of the pivot pin.

* * * * *